United States Patent
Goto et al.

(10) Patent No.: US 6,838,839 B2
(45) Date of Patent: Jan. 4, 2005

(54) ELECTRIC CIRCUIT OF ELECTRIC VEHICLE

(75) Inventors: Naomi Goto, Shiga (JP); Makoto Yoshida, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 70 days.

(21) Appl. No.: 10/045,325

(22) Filed: Oct. 25, 2001

(65) Prior Publication Data

US 2002/0140290 A1 Oct. 3, 2002

(30) Foreign Application Priority Data

Oct. 25, 2000 (JP) ........................................ 2000-325313

(51) Int. Cl.[7] .............................. H02P 3/00; H02P 5/00; H02P 7/00
(52) U.S. Cl. ........................ 318/139; 318/433; 318/434; 318/98
(58) Field of Search ............................... 318/139, 51, 97, 318/41, 8, 434, 432, 433, 439, 254, 138, 98; 174/28, 102 R, 27; 62/180, 298, 324.6, 228.4, 126, 186; 361/23–31

(56) References Cited

U.S. PATENT DOCUMENTS

| | | | | |
|---|---|---|---|---|
| 4,856,286 A | * | 8/1989 | Sulfstede et al. | 62/89 |
| 5,237,494 A | * | 8/1993 | Baader et al. | 363/141 |
| 5,261,252 A | * | 11/1993 | Peruch | 494/14 |
| 5,309,052 A | * | 5/1994 | Kim | 310/51 |
| 5,452,201 A | * | 9/1995 | Pieronek et al. | 700/83 |
| 5,528,114 A | * | 6/1996 | Tokizaki et al. | 318/67 |
| 5,594,199 A | * | 1/1997 | Ciaccio | 174/35 R |
| 5,604,672 A | * | 2/1997 | Yoshida et al. | 363/97 |
| 5,646,852 A | * | 7/1997 | Lorenz et al. | 701/103 |
| 5,694,010 A | * | 12/1997 | Oomura et al. | 318/254 |
| 5,712,540 A | * | 1/1998 | Toda et al. | 318/46 |
| 5,744,921 A | * | 4/1998 | Makaran | 318/254 |
| 5,757,151 A | * | 5/1998 | Donegan et al. | 318/150 |
| 5,769,907 A | * | 6/1998 | Fukuda et al. | 29/25.03 |
| 5,877,600 A | * | 3/1999 | Sonntag | 318/139 |
| 6,002,218 A | * | 12/1999 | Toda et al. | 318/66 |
| 6,037,725 A | * | 3/2000 | Tolbert, Jr. | 318/110 |
| 6,132,177 A | * | 10/2000 | Loprete et al. | 417/221 |
| 6,153,993 A | * | 11/2000 | Oomura et al. | 318/434 |
| 6,172,476 B1 | * | 1/2001 | Tolbert et al. | 318/772 |
| 6,207,900 B1 | * | 3/2001 | Wagner | 174/102 R |
| 6,281,649 B1 | * | 8/2001 | Ouellette et al. | 318/443 |
| 6,331,925 B1 | * | 12/2001 | Loprete et al. | 361/22 |
| 6,389,823 B1 | * | 5/2002 | Loprete et al. | 62/89 |
| 6,414,455 B1 | * | 7/2002 | Watson | 318/432 |
| 6,476,329 B2 | * | 11/2002 | Tsukamoto et al. | 174/117 F |

FOREIGN PATENT DOCUMENTS

| | | | | | |
|---|---|---|---|---|---|
| JP | 64031380 A | * | 2/1989 | | H05B/6/64 |
| JP | 08043440 A | * | 2/1996 | | G01R/5/16 |
| JP | 10035245 A | * | 2/1998 | | B60H/1/00 |

* cited by examiner

*Primary Examiner*—David Martin
*Assistant Examiner*—Patrick Miller
(74) *Attorney, Agent, or Firm*—RatnerPrestia

(57) ABSTRACT

An electric vehicle includes a drive-motor driving device and a compressor-driving device for air-conditioning. Both of these driving devices share a smoothing capacitor and a radiator. The drive-motor driving devices, the compressor-driving device, and the smoothing capacitor are disposed in a shielding case against electromagnetic wave, so that the electric circuit of the vehicle can be downsized and light-weighted.

20 Claims, 29 Drawing Sheets

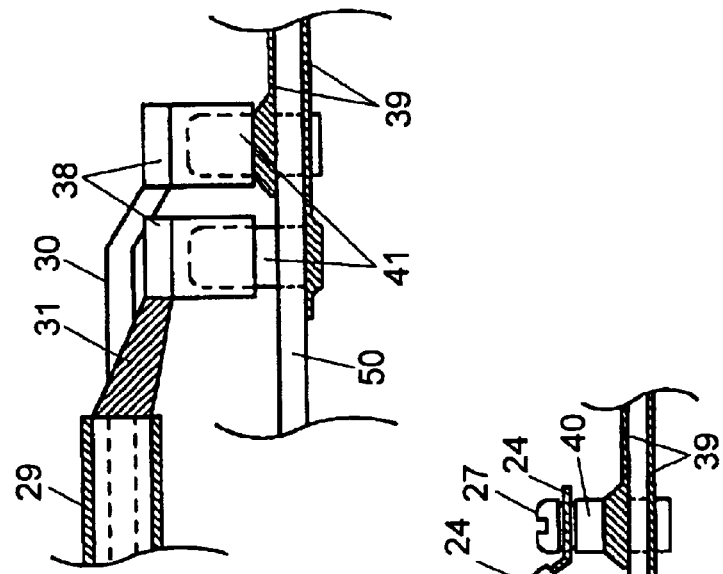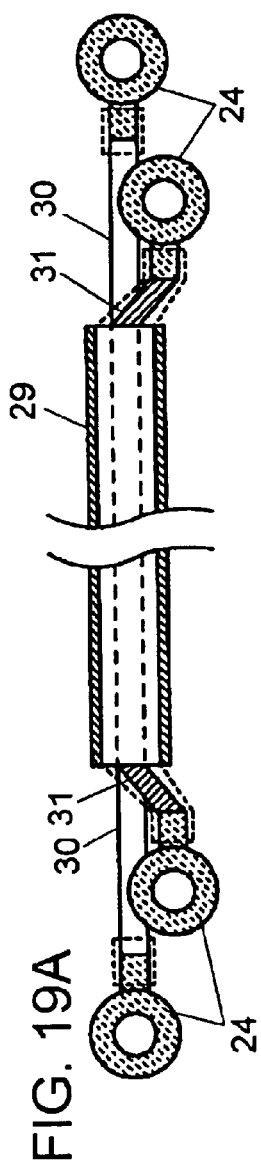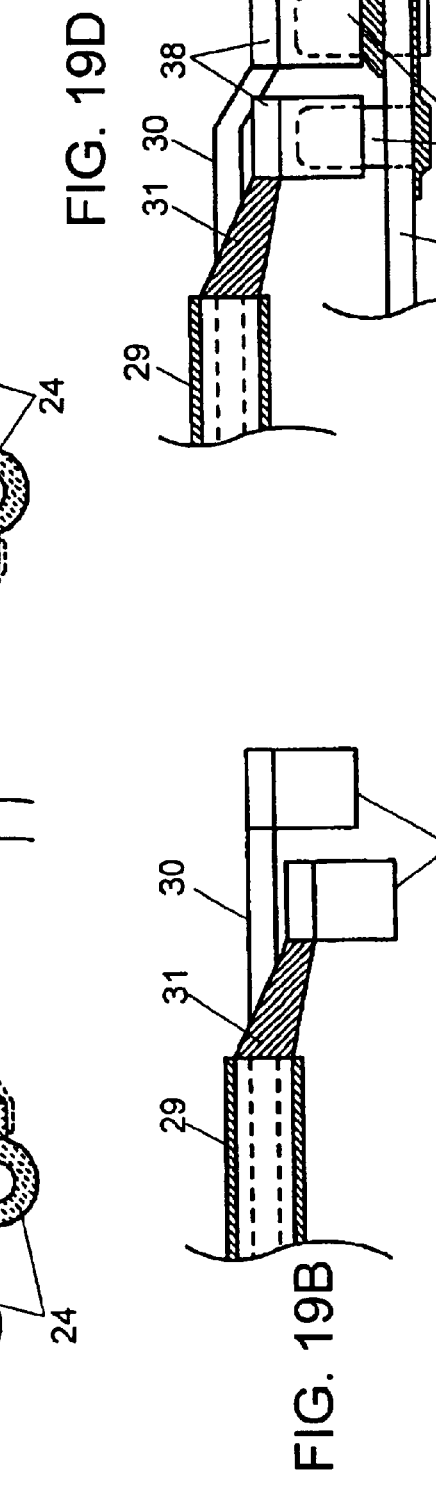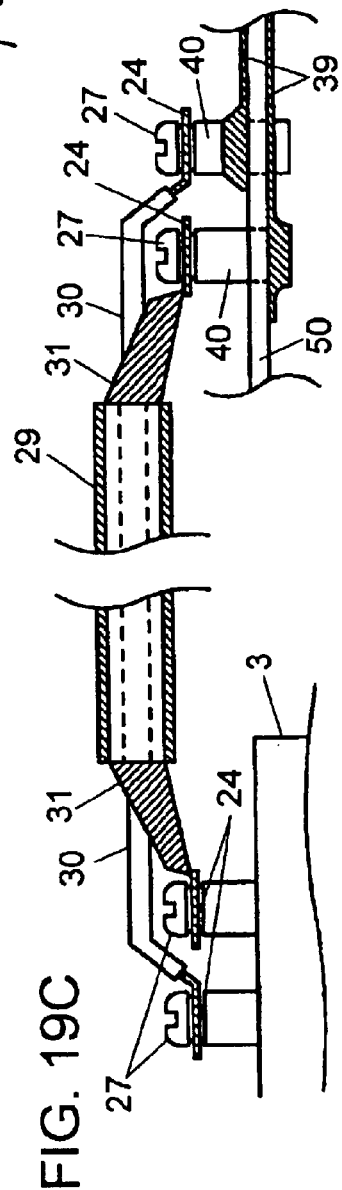

ELECTRIC CIRCUIT OF ELECTRIC VEHICLE

FIELD OF THE INVENTION

The present invention relates to an electric circuit of an electric vehicle which is equipped with a drive-motor driving device and an electric-compressor-driving device for air-conditioning the vehicle. More particularly, it relates to an electric circuit for the electric-compressor-driving device.

BACKGROUND OF THE INVENTION

FIG. 23A shows an outlook of a conventional driving device for an electric compressor. Power-lead wires 55 are coupled to a main battery, of which output is approx. DC 300V, built in an electric vehicle. An inverter-circuit-converting DC current supplied from the battery into AC current-is built in the driving device. A housing case is made of metal, and blocks electromagnetic waves radiating from inside to outside of the case as well as incoming from outside to inside of the case. The heat generated in the inverter-circuit dissipates into cooling water running through water-cooling pipe 56. FIG. 23B shows inside of the driving device, where circuit board 57 with electronic components, and electrolytic capacitor 64 are disposed. Inverter-module 60 and protective diode 63, both shown in FIG. 24, are coupled to circuit board 57. Protective diode 63 would block the current if power-lead wires 55 are coupled to the battery with the reverse polarity by mistake. Both of inverter-module 60 and diode 63 are mounted to a cooling mechanism for pipe 56.

FIG. 25 shows a circuit diagram of the electric vehicle. Battery 1 supplies current to motor driving device 4 and compressor driving device 5 via turn-on device 2. Device 4 drives drive-motor 62, and device 5 drives electric compressor 23. Drive-motor driving device 4 includes inverter-circuit 8 and electrolytic capacitor 3 which smoothes current to be supplied to inverter-circuit 8. Drive-motor 62 is coupled to inverter-circuit 8. Compressor-driving device 5 includes inverter-circuit 9, electrolytic capacitor 64 and protective diode 63. Capacitor 64 smoothes current to be supplied to circuit 9, and diode 63 blocks inverse current. Compressor 23 is coupled to inverter-circuit 9. Turn-on device 2 charges capacitors 3 and 64 up to the same voltage as battery 1 via charging-resistor 10, then supplies current from battery 1 to driving devices 4 and 5 via main relay 11.

FIG. 26 shows a circuit diagram of driving device 5 for the compressor. Air-conditioning controller 21, disposed outside device 5, calculates ability, e.g., an r.p.m. of compressor 23, and inputs the ability to microcomputer 19, which controls the inverter, via communication circuit 20. Control power supply 22 powers microcomputer 19, communication circuit 20, air-conditioning controller 21, and an audio and a navigation systems (not shown) and the like. Power supply 22 is insulated from battery 1, and battery 1 feeds power to power supply 22 via a DC—DC converter. The voltage-supplied from battery 1 and applied to driving device 5-is divided by upper voltage-dividing resistor 13 and lower voltage-dividing resistor 14. The voltage is then insulated by voltage-detector 16 and fed into microcomputer 19. The current running through inverter-circuit 9 is detected by current sensor 15 and insulated by current detector 17, then fed into microcomputer 19 which controls the inverter. Based on at least these inputs, microcomputer 19 sends a signal to gate-driving circuit 18, thereby activating a group of switching elements of inverter-circuit 9 for driving compressor 23. Gate-driving circuit 18 also insulates circuit 9 from microcomputer 19. Microcomputer 19 receives temperature data continuously from a thermistor-temperature-sensor of compressor 23 in addition to the inputs discussed above. Switching power supply 12 produces a power source for gate-driving circuit 18 and others. Current sensor 15 includes a coil and thus has an inductance component.

FIG. 27A shows a waveform of a current fed into inverter-circuit 9. FIG. 27B shows a waveform of a current fed into compressor-driving device 5. The waveform of current fed into inverter-circuit 9 shapes in a rectangular, and the current fed into compressor-driving device 5 shapes in a ripple-waveform, which however contains a constant current because the current to be fed into circuit 9 is smoothed by electrolytic capacitor 64.

A surge voltage generated in driving device 5 is described hereinafter with reference to FIGS. 28 and 29. FIG. 28 shows a circuit diagram where electrolytic capacitor 64 is deleted. Lead-wires from the power supply have inductance components 65. The current, of which waveform is illustrated in FIG. 29A, runs through inductance component 65 and flows into inverter-circuit 9. As a result, the surge voltage shown in FIG. 29C is generated when the current is turned off. In this case, if protective diode 63 exists, it would tend to block the energy of inductance component 65 from being released by the resonance between stray electrostatic capacitance on the power-line and the inductance component 65. As a result, the circuit is vulnerable to damage by the surge voltage. If electrolytic capacitor 64 exists in the circuit, the current flowing into inverter-circuit 9 would run as short as between capacitor 64 and circuit 9, thus the surge voltage is not generated as shown in FIG. 29B.

Conventional compressor-driving device 5 discussed above is desirably downsized and light-weighted in order to reduce the size and weight of electric circuits of an electric vehicle. Metallic cases, electrolytic capacitor 64 and protective diode 63 against a reversal connection are desirably removed; however, the removal of these elements would cause various problems.

SUMMARY OF THE INVENTION

The present invention addresses the problems discussed above and aims to provide electric circuits of smaller size and lighter weight for an electric vehicle. A metal case for shielding electromagnetic wave, a smoothing capacitor and a radiator in the circuit are shared by a drive-motor driving device and a compressor-driving device so that the electric circuit in an electric vehicle can be downsized and light-weighted. In order to reduce the load to the smoothing capacitor shared, the compressor-driving device lowers its output when the drive-motor-driving device is heavily loaded.

A surge voltage generated on a power-line is lowered by the following two measures: (1) A shielded-line is used as the power-line so that inductance of the power-line can be lowered and stabilized. (2) A capacitor for resonating with the inductance of the power-line is provided.

BRIEF DESCRIPTION OF THE DRAWINGS

FIG. 19A–FIG. 19D show terminals of lead wires in accordance with the ninth exemplary embodiment.

DETAILED DESCRIPTION OF THE INVENTION

First Exemplary Embodiment

Figure 1:
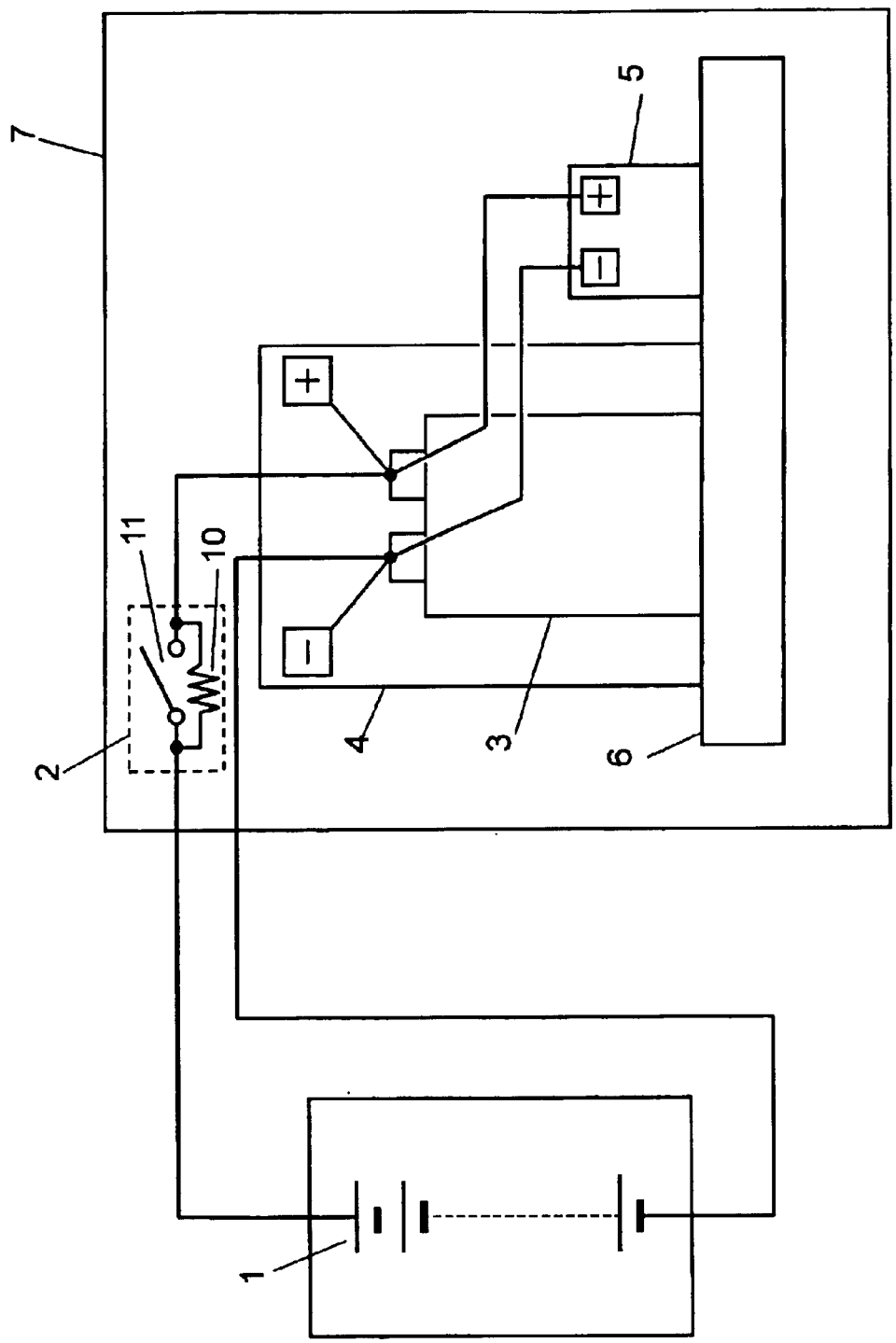
FIG. 1 is a schematic diagram illustrating a structure of a device driving an invention.

In FIG. 1, electromagnetic-wave shielding case 7 houses (a) drive-motor driving device 4, (b) compressor-driving device 5, (c) electrolytic capacitor 3 functioning as a smoothing capacitor, and (d) radiator 6. Drive-motor driving device 4 and compressor-driving device 5 share capacitor 3 and radiator 6. Devices 4 and 5 are coupled to battery 1 via turn-on device 2, and solidly contact with radiator 6 so that radiator 6 can dissipate the heat generated in both the devices. Battery 1 can be housed by case 7. Radiator 6 may use a water-cooling method (not shown).

Figure 2:
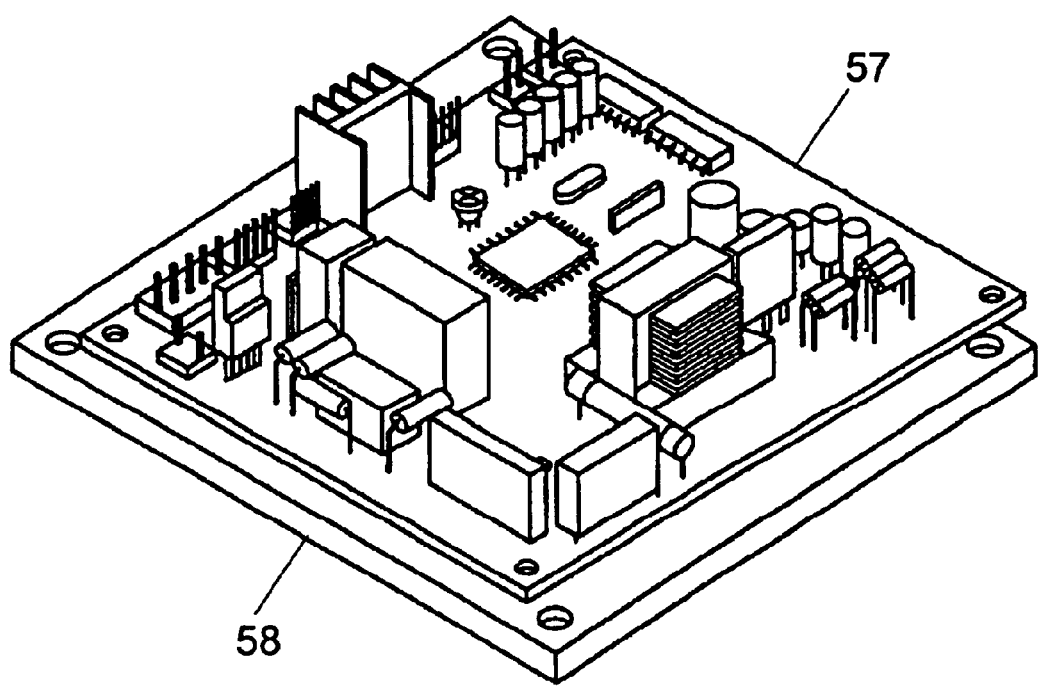
FIG. 2 is a perspective view of a device driving an electric compressor in accordance with the first exemplary embodiment of the present invention.

FIG. 2 shows a perspective view of the compressor-driving device. Inverter-circuit 9 is connected beneath circuit board 57. Heat conductor 58 is disposed beneath circuit board 57 for conveying heat to radiator 6. Inverter-circuit 9 is mounted to heat conductor 58, which may take any shapes as long as it conveys the heat.

Figure 3:
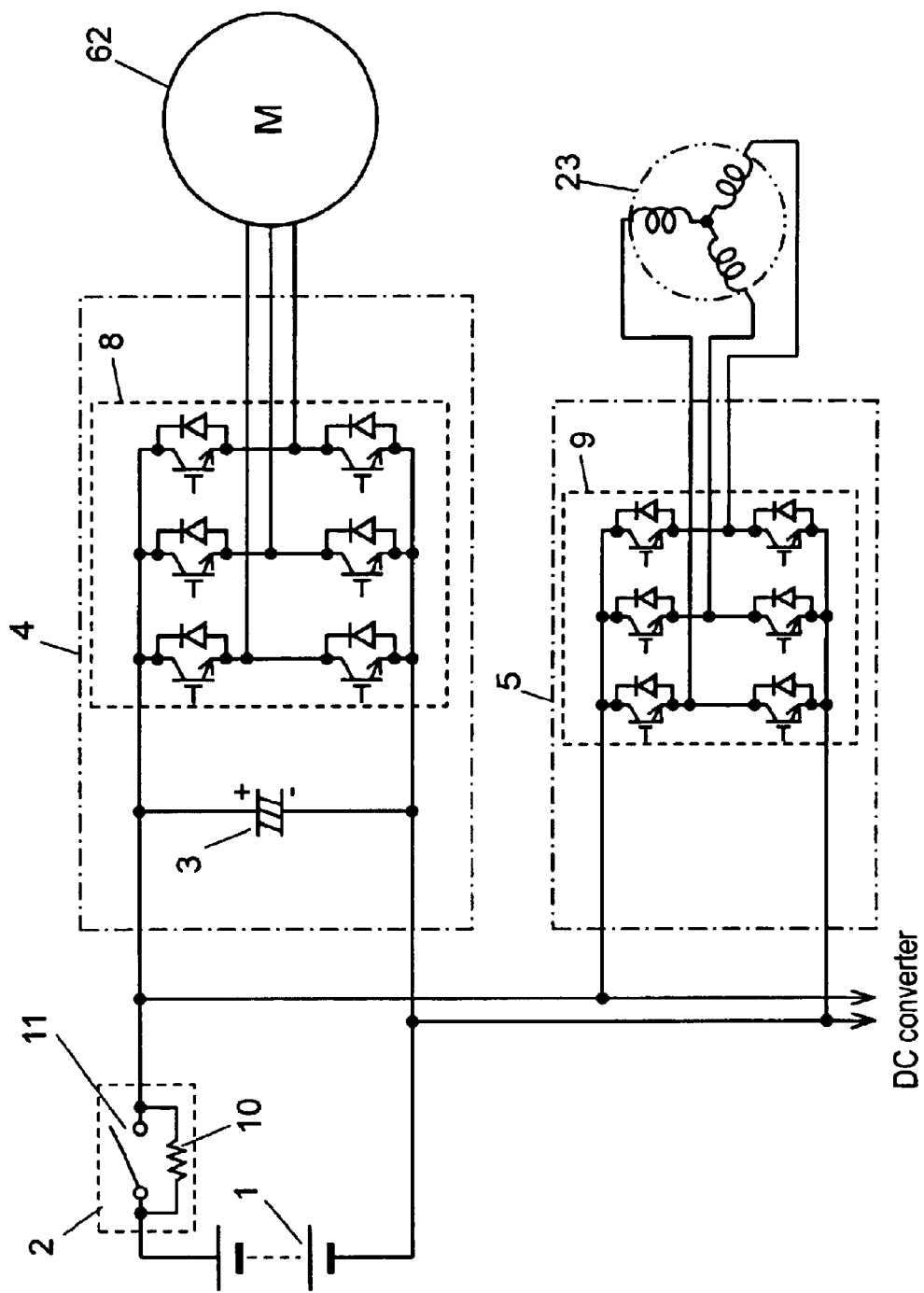
FIG. 3 is a circuit diagram of the device driving the electric vehicle shown in FIG. 1.
Figure 25:
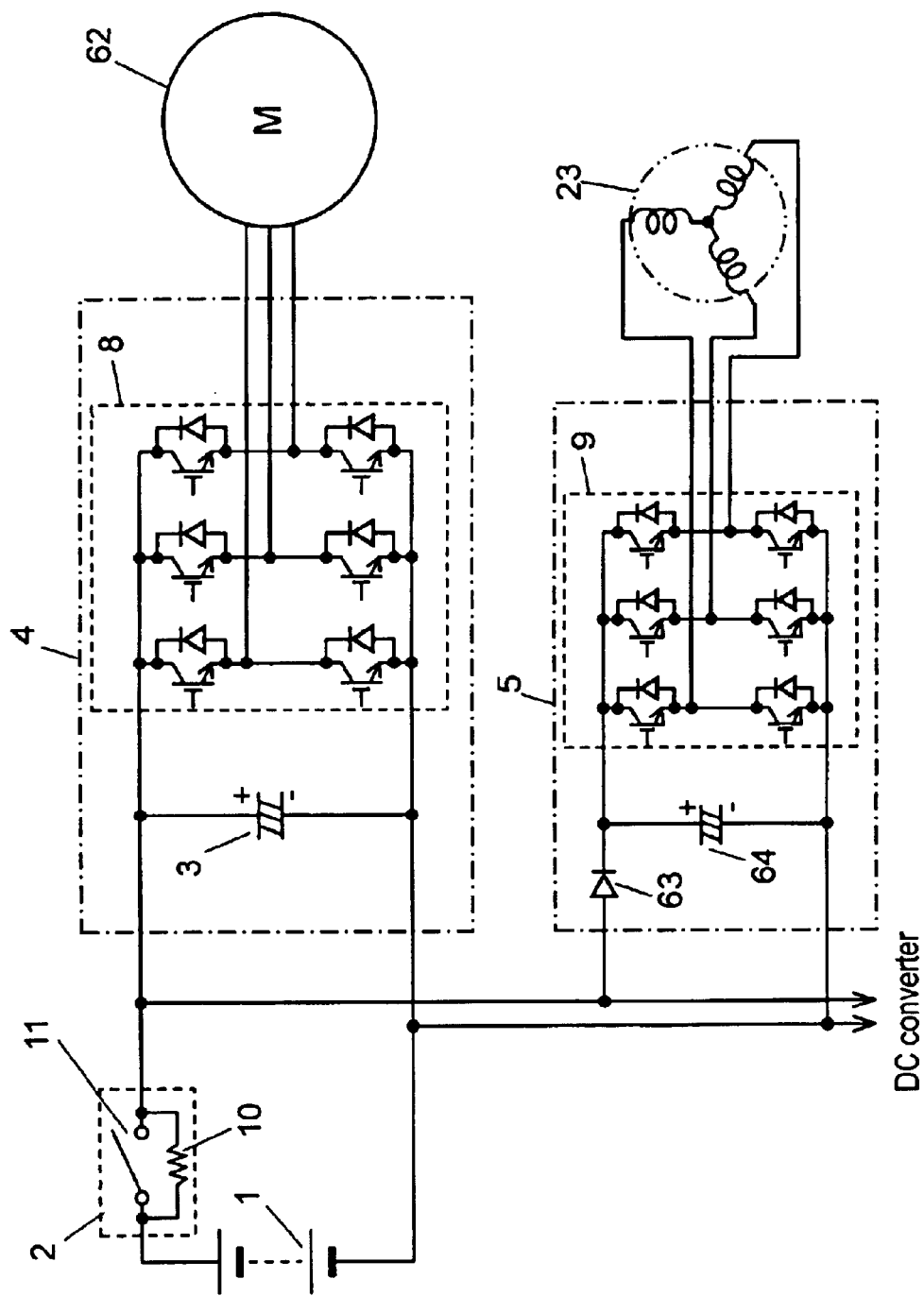
FIG. 25 is a circuit diagram of a conventional electric vehicle.

FIG. 3 is a circuit diagram where protective diode 63 against a reversal connection and electrolytic capacitor 64 used in the compressor-driving device are deleted from the circuit diagram shown in FIG. 25.

Figure 4:
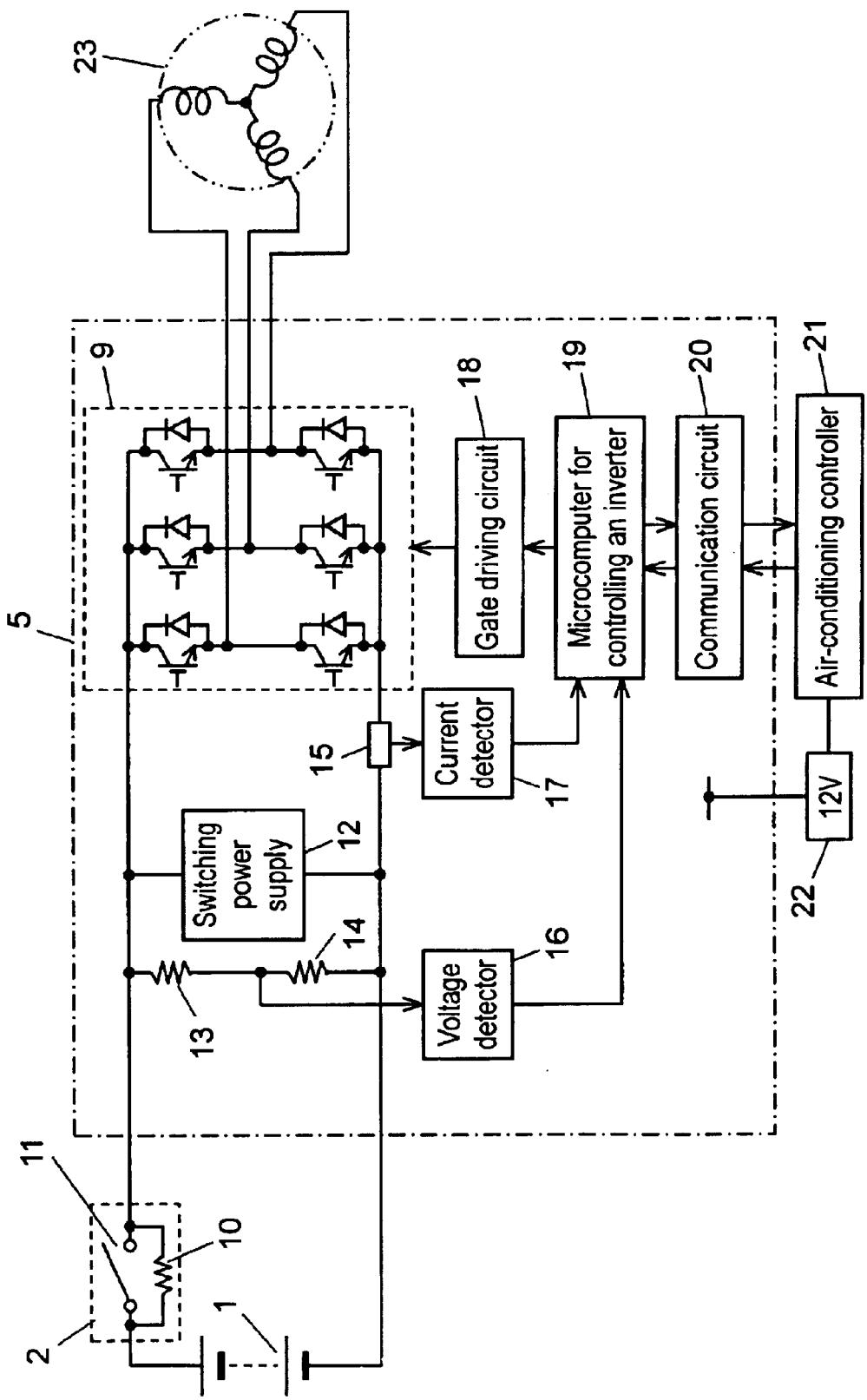
FIG. 4 is a circuit diagram of the device driving the compressor shown in FIG. 2.
Figure 26:
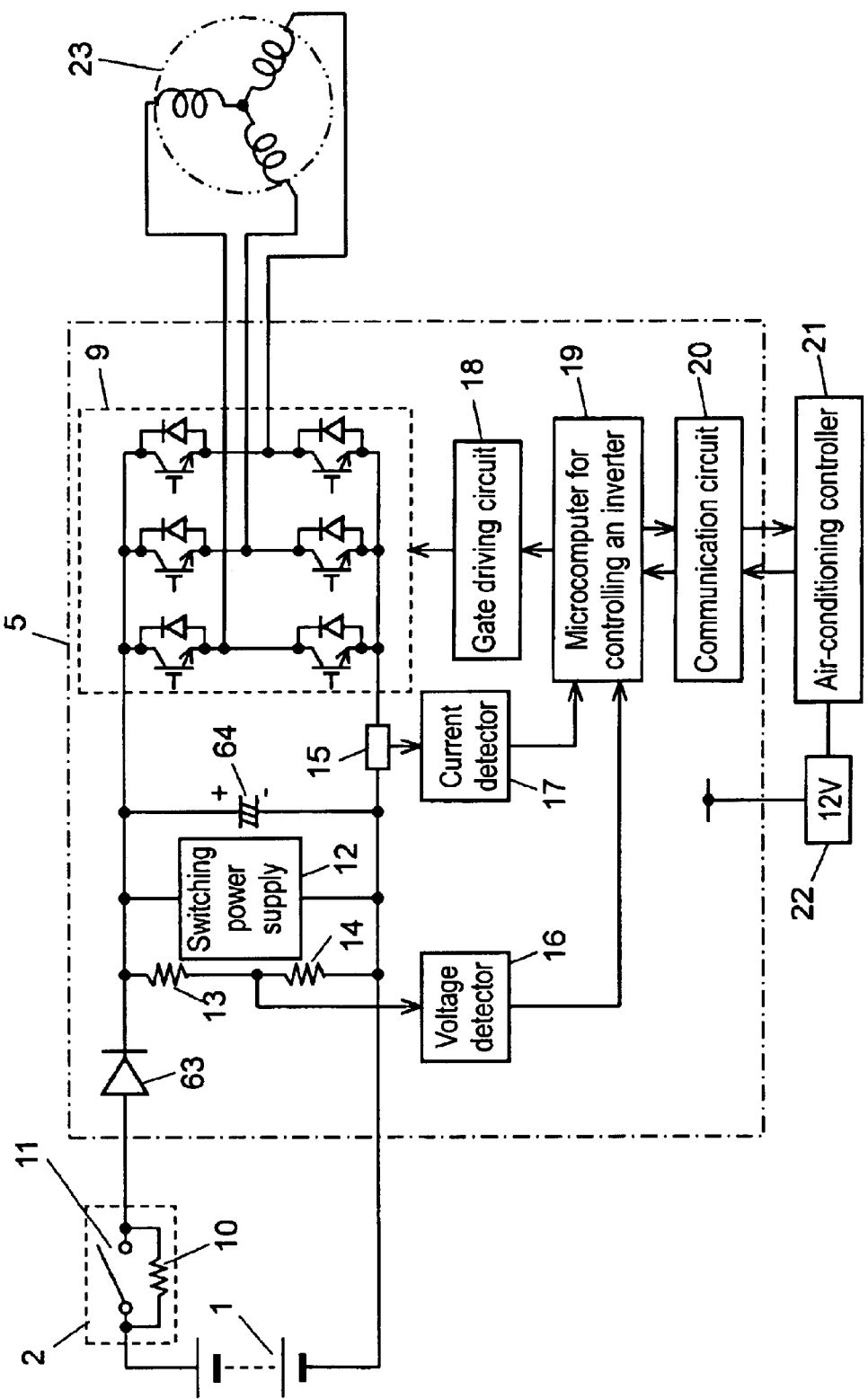
FIG. 26 is a circuit diagram of the conventional compressor-driving device.
Figure 27A:
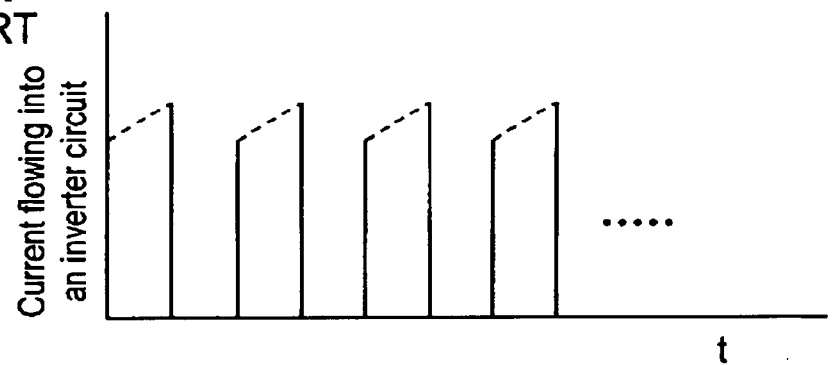
FIG. 27A shows a waveform of a current flowing into an inverter-circuit of the conventional compressor-driving device.
Figure 27B:
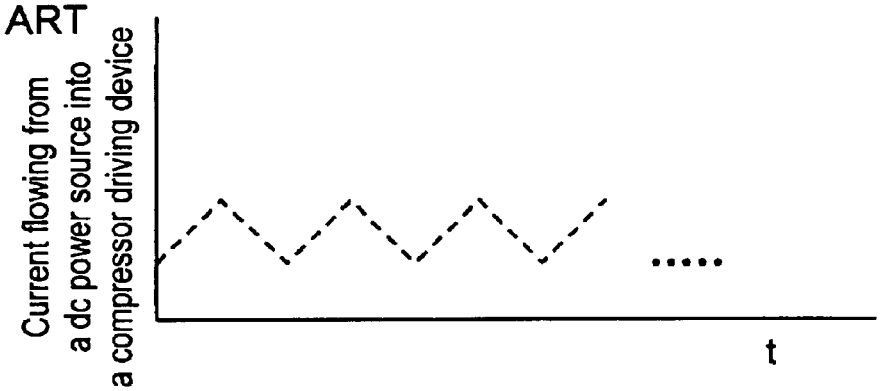
FIG. 27B shows a waveform of a current flowing into the conventional compressor-driving device.
Figure 28:
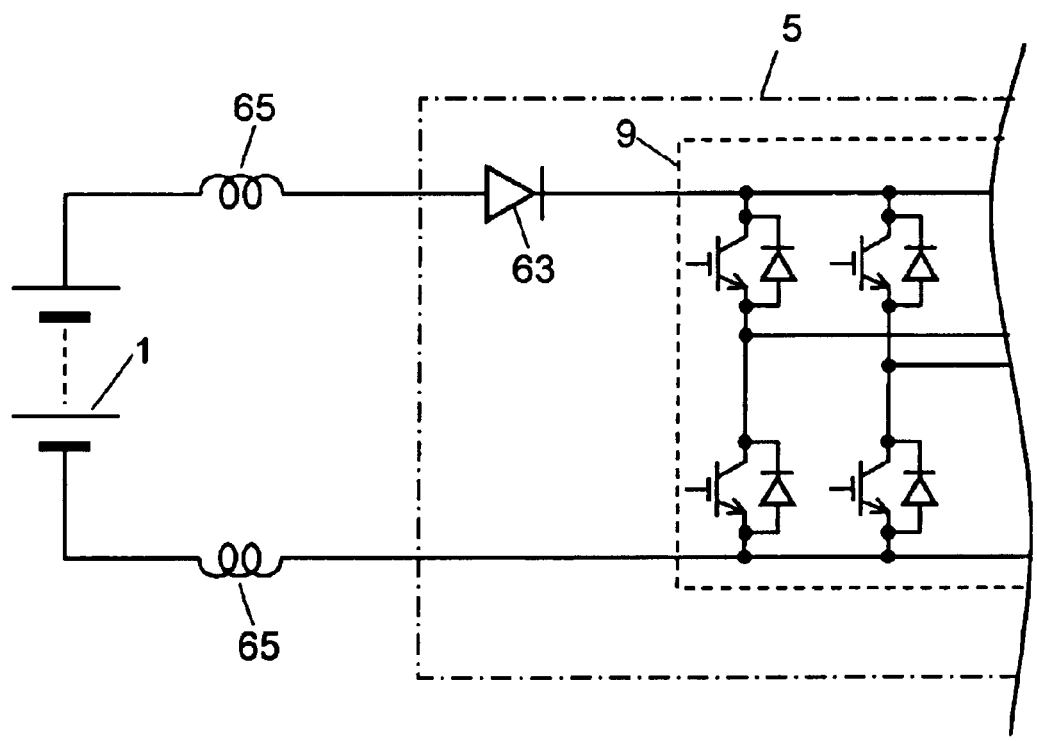
FIG. 28 shows conventional inductance of power-lead wires.

FIG. 4 is a circuit diagram of the compressor-driving device in accordance with the first embodiment. As same as FIG. 3, in FIG. 4, protective diode 63 and electrolytic capacitor 64 are deleted from the circuit diagram shown in FIG. 26.

Figure 5A:
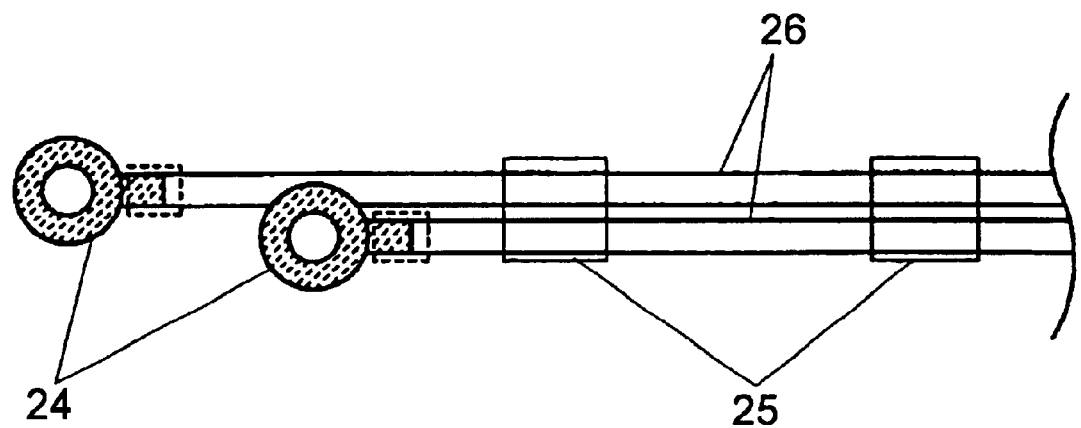
FIG. 5A illustrates connecting terminals of power-lead wires.
Figure 5B:
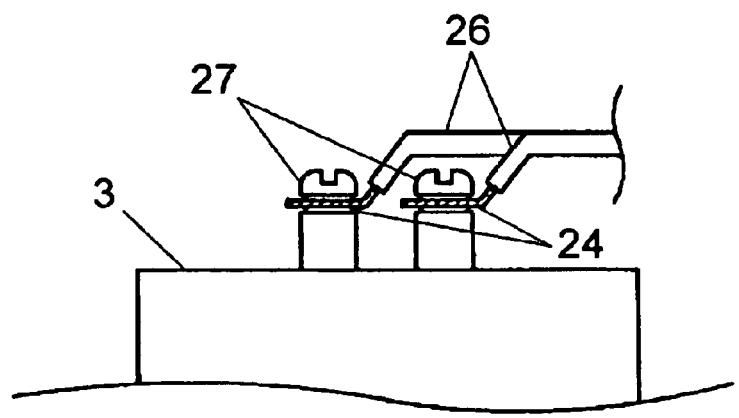
FIG. 5B illustrates connections of the wires shown in FIG. 5A.

FIG. 5A illustrates power-lead wires. Two wires, having different lengths, are taped up together. FIG. 5B illustrates the connections of the lead wires. The shorter wire can be coupled only to the closer terminal. In a conventional manner, there have been numbers of connections before the power supply, so that a reversal connection would happen on the way to the power supply. However, in this embodiment, the compressor-driving device has no housing case, and it is housed in shielding case 7 together with both of drive-motor driving device 4 and electrolytic capacitor 3, so that only one connection is required before the power supply. This structure thus can prevent the reversal connection. Employing terminals different in sizes and types would determine the combination of male vs. female mechanically, so that the reversal connection can be prevented more positively. The structure discussed above can eliminate protective diode 63 against the reversal connection, so that downsizing and energy-saving can be expected. Lead wires 26 are not always coupled to capacitor 3.

Figure 6A:
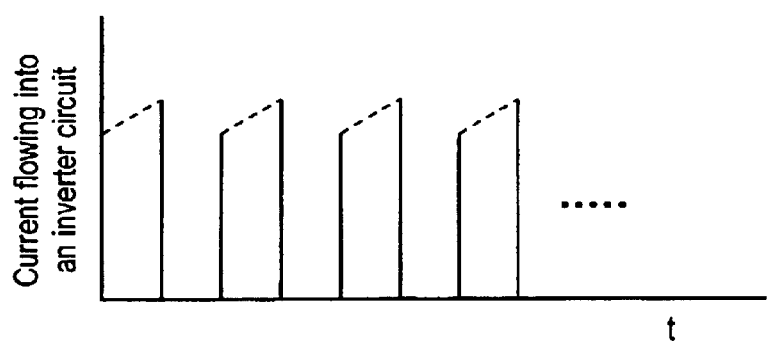
FIG. 6A shows a waveform of a current flowing into an inverter-circuit in accordance with the first exemplary embodiment of the present invention.
Figure 6B:
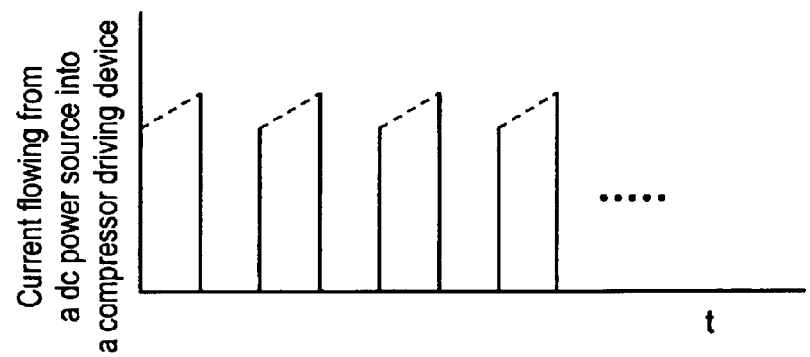
FIG. 6B shows a waveform of a current flowing into the compressor-driving device in accordance with the first exemplary embodiment of the present invention.
Figure 6C:
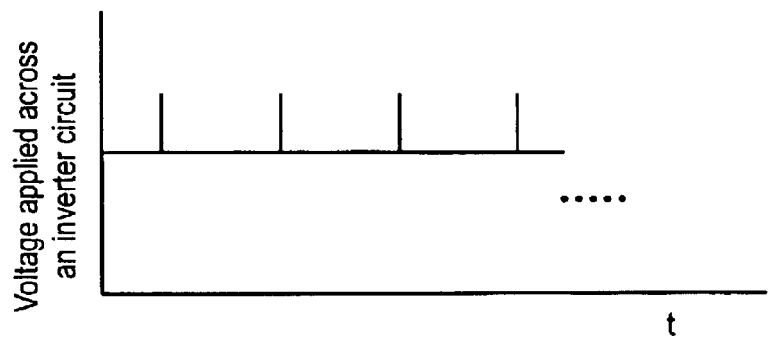
FIG. 6C shows a waveform of a voltage applied to the inverter-circuit.
Figure 29A:
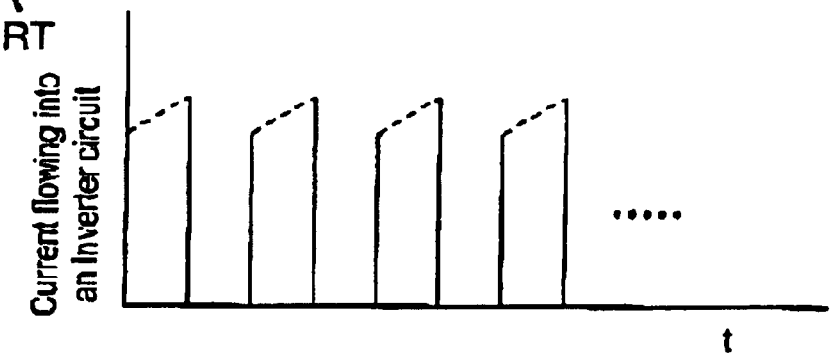
FIG. 29A shows a waveform of a current flowing into the conventional inverter-circuit.
Figure 29B:
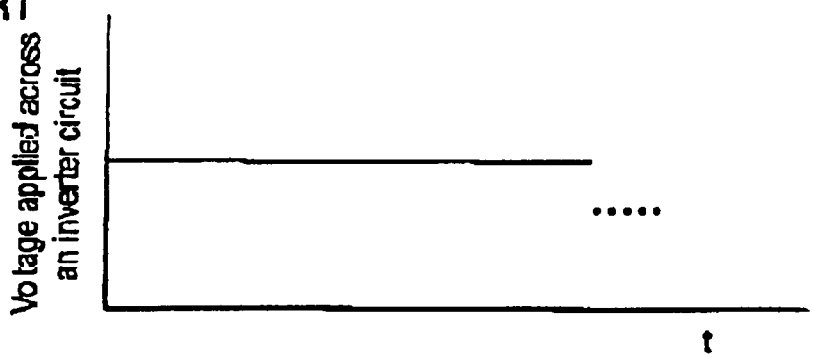
FIG. 29B shows a waveform of a voltage applied to the conventional inverter-circuit.
Figure 29C:
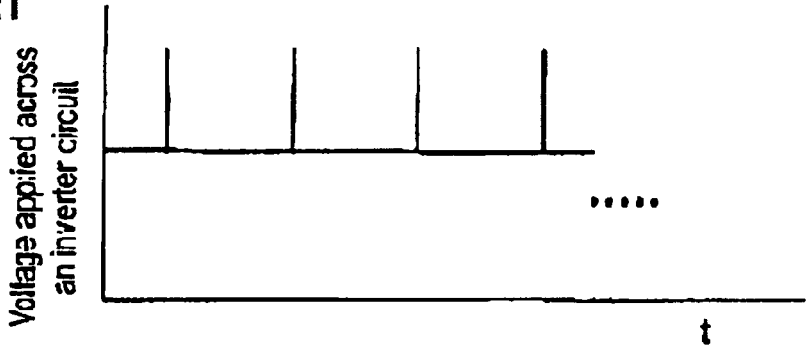
FIG. 29C shows a waveform of the voltage applied to the conventional inverter-circuit where an electrolytic capacitor has been removed.

FIG. 6A shows a waveform of a current flowing into the inverter-circuit. The waveform takes the same form as the conventional example. FIG. 6B shows a current flowing into the compressor-driving device. This waveform differs from the conventional one in non-smoothed current, because the current is not smoothed due to no electrolytic capacitor 64, so that the waveform takes the same form as that of the current flowing into the inverter-circuit. FIG. 6C shows a waveform of a voltage applied to the inverter-circuit. Since compressor-driving device 5 is smaller than the conventional one, device 5 can be placed closer to electrolytic capacitor 3. The power-lead wires thus can be shorter, and the smaller inductance can be expected. As a result, a smaller surge voltage than conventional one shown in FIG. 29C can be expected, so that the circuit of compressor-driving device 5 is prevented from being damaged.

Since an electrolytic capacitor can recover its voltage after discharge, electrolytic capacitor 64 for the compressor-driving device would sometimes produce discharging-spark with electrolytic capacitor 3 when this circuit is built. This spark affects maintenance works and causes blowing a fuse. However, since capacitor 64 has been removed here, there is nothing to worry about this. Being shared by both the driving devices, capacitor 3 bears a greater load; however, the increase of the load (ripple current increases) is small in a regular electric vehicle. For instance, the max. output of the drive-motor driving device is 50 kW (300V, 167 A) and the standing output is 5 kW(300V, 17 A), while the max. output of the compressor-driving device is as small as 3 kW(300V, 10 A) and the standing output is 1 kW(300V, 3 A). Actually, the electrolytic capacitor for the drive-motor driving device has 10 times capacity (comparing the maximum output) as much as the compressor-driving device. The same story can be applied to the dissipating capacity of radiator 6. In this embodiment, the electrolytic capacitor is used as a smoothing capacitor; however, it is not limited to the electrolytic capacitor.

Second Exemplary Embodiment

Figure 7:
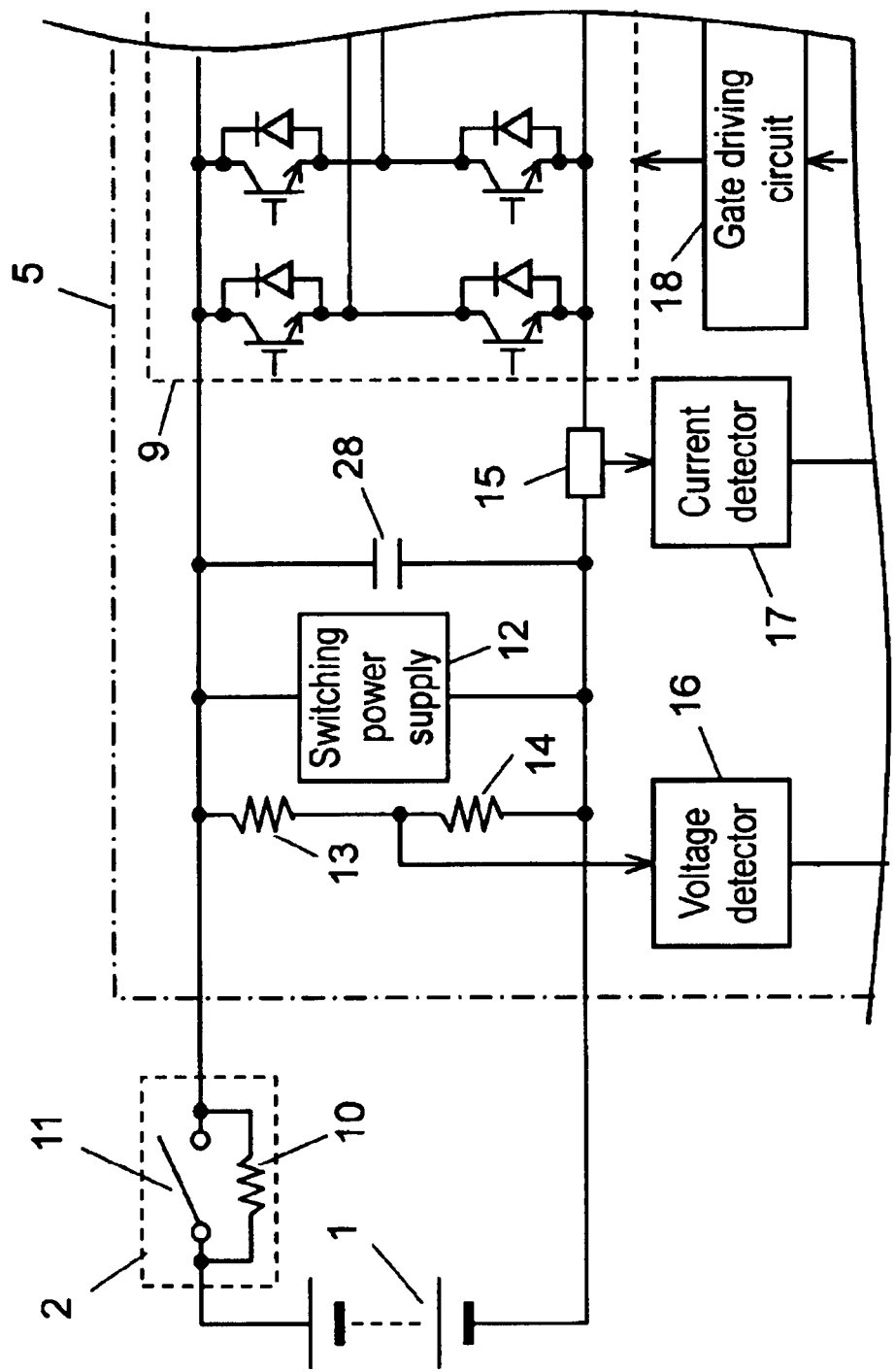
FIG. 7 is a circuit diagram of the device driving an electric compressor in accordance with a second exemplary embodiment of the present invention.

FIG. 7 shows a circuit diagram of a compressor-driving device in accordance with the second embodiment. Film capacitor 28, which is an additional element to the circuit diagram shown in FIG. 4, is put between both the poles of a power supply.

Figure 8A:
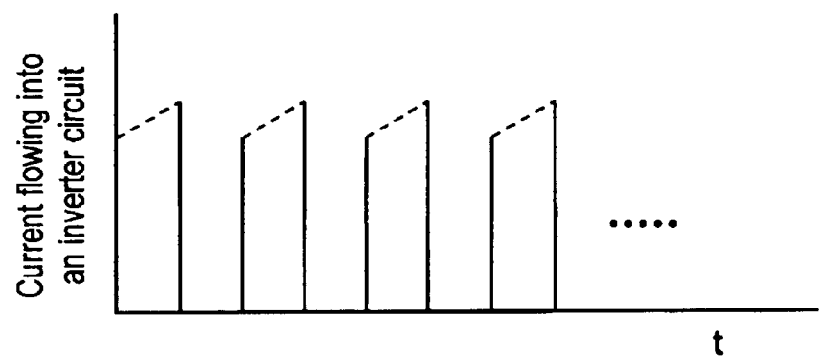
FIG. 8A shows a waveform of a current flowing into an inverter-circuit in accordance with the second exemplary embodiment of the present invention.
Figure 8B:
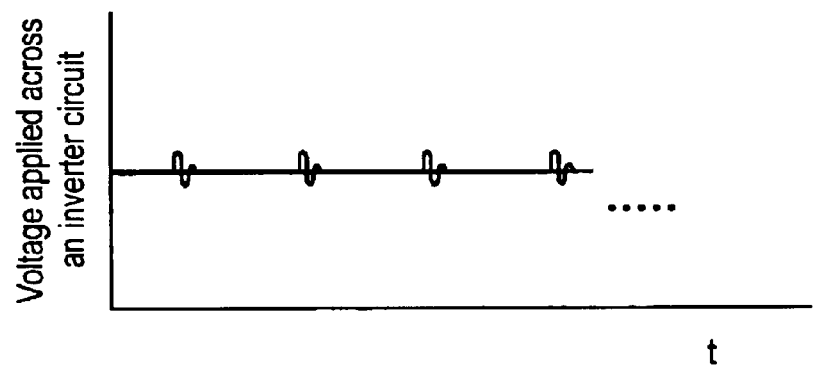
FIG. 8B shows a voltage applied to the inverter-circuit in accordance with the second exemplary embodiment of the present invention.

FIG. 8A shows a waveform of a current flowing into an inverter-circuit. This waveform takes the same form as the conventional one. FIG. 8B shows a waveform of a voltage applied to the inverter-circuit. Being compared with the waveform shown in FIG. 29C (conventional case) and that in FIG. 6C (the first embodiment), the waveform in FIG. 8B shows no surge voltage but small resonant voltages because film capacitor 28 resonates with inductance of the power-lead wires. A surge voltage thus becomes smaller, thereby preventing the circuit of compressor-driving device from being damaged. Since there is no protective diode 63 against a reversal connection, this resonance can be produced. Current sensor 15 is disposed on the right side of film capacitor 28 so that resonant current cannot flow. The film capacitor is made of plastic film as major dielectric material and metal foil as an electrode. Its capacity is smaller than that of an electrolytic capacitor; however, it has better high-frequency characteristic which advantageously absorbs the surge voltage. A ceramic capacitor also can be used, which is made of ceramics as major dielectric material and metallic film applied as an electrode.

Third Exemplary Embodiment

Figure 9:
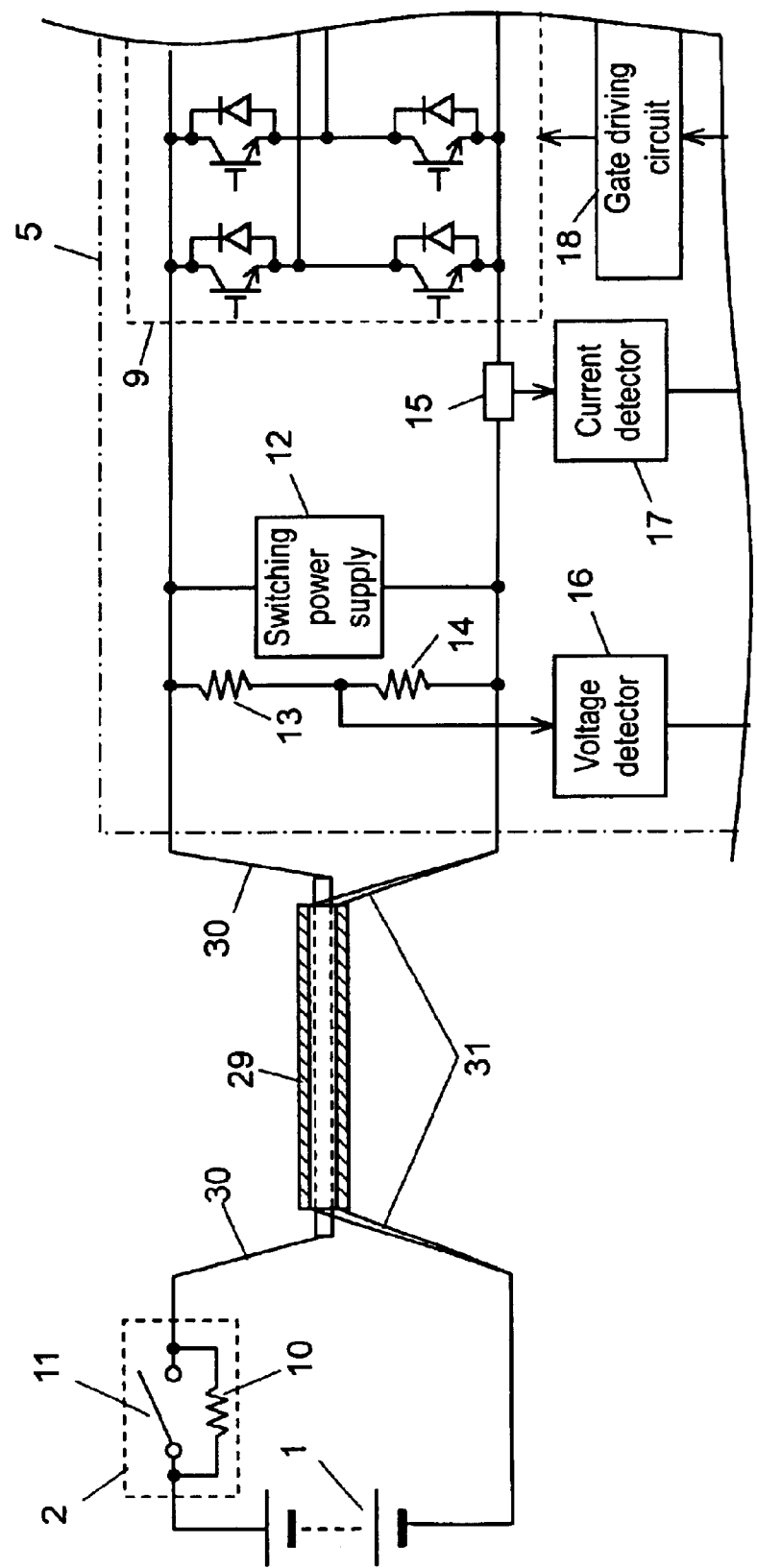
FIG. 9 is a circuit diagram of a compressor-driving device in accordance with a third exemplary embodiment of the present invention.

FIG. 9 shows a circuit diagram of a compressor-driving device in accordance with the third embodiment. What is different from the circuit diagram shown in FIG. 4 (the first embodiment) is that one shielded-line 29 is used as a power-lead. The core wire of shielded-line 29 is used for a plus (+) wire and the outer wire is used for a minus (−) wire.

Figure 10A:
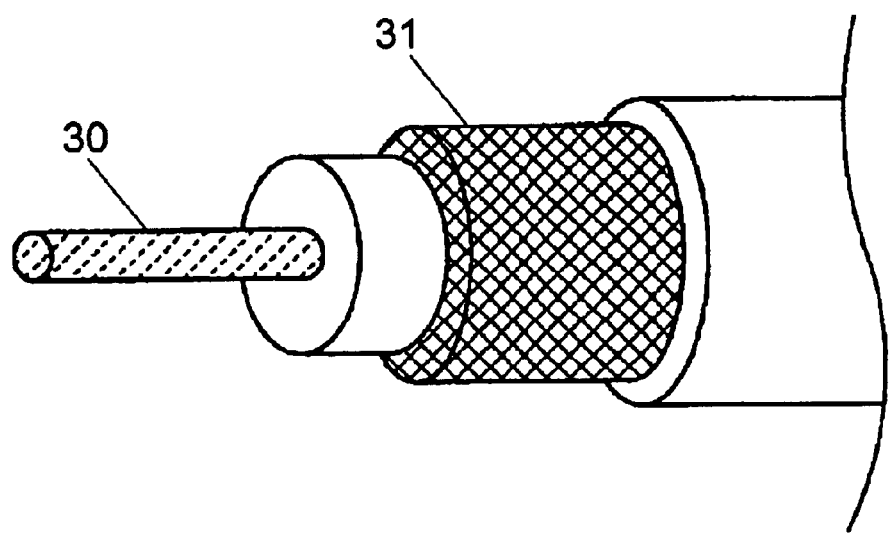
FIG. 10A illustrates a structure of a shielded-line in accordance with the third exemplary embodiment of the present invention.
Figure 10B:
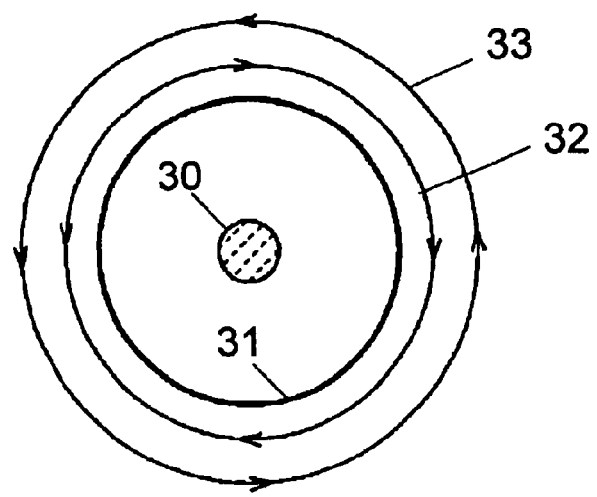
FIG. 10B illustrates magnetic field generated by the shielded-line shown in FIG. 10A.

FIG. 10A illustrates a structure of the shielded-line. Core wire 30 is surrounded by outer wire 31. FIG. 10B illustrates directions of the magnetic field. Since the currents through core wire 30 and outer wire 31 travel in opposite directions, magnetic field 32 produced by a core-wire current runs in the opposite direction to magnetic field 33 produced by an outer-wire current, and they cancel each other. Thus the inductance of the shielded-line becomes smaller.

Figure 11:
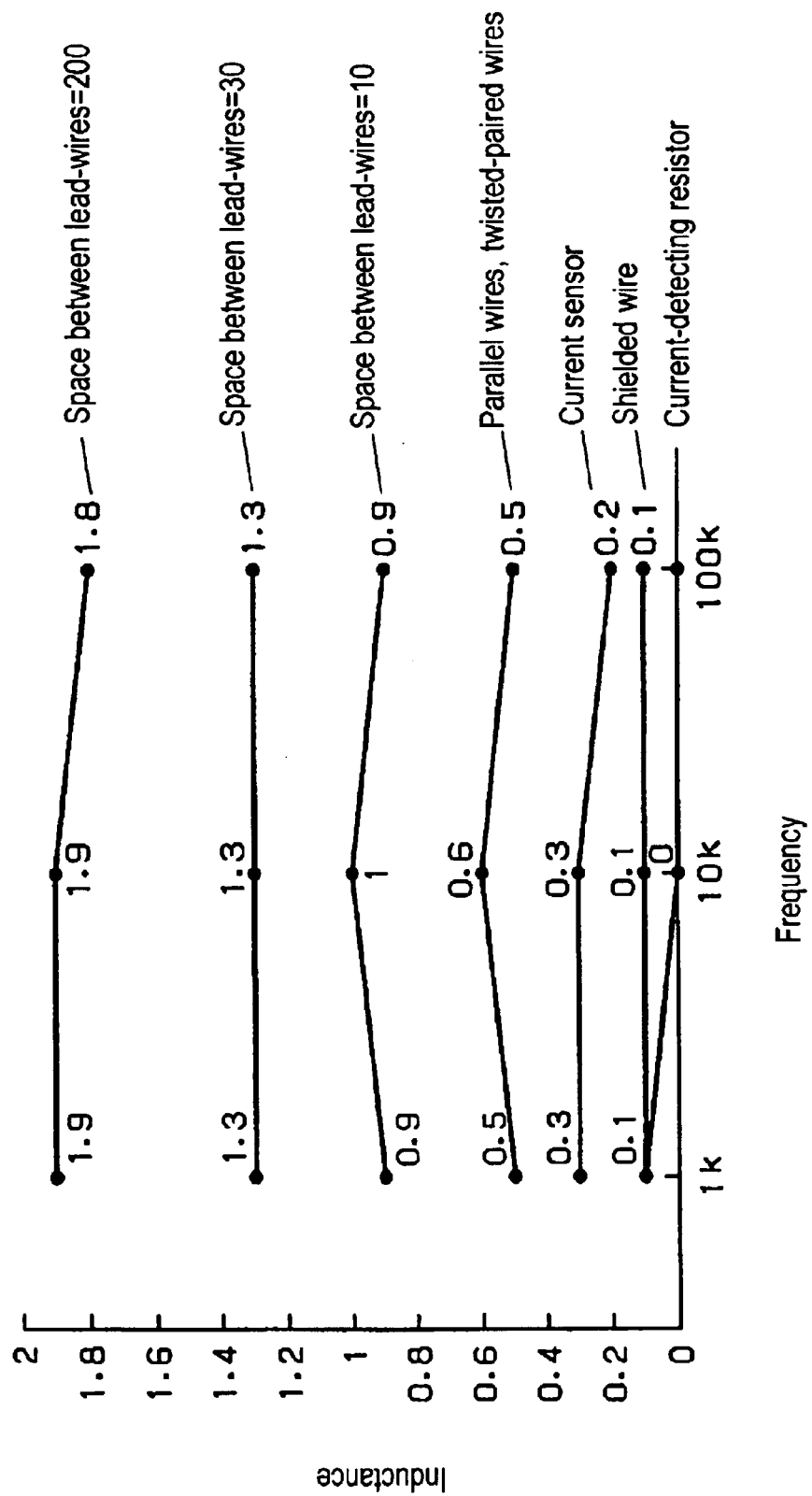
FIG. 11 shows inductance of lead wires and components.

FIG. 11 shows inductance-data of wires and other elements. The inductance of wires are measured on the same lengths; two lead-wires of one meter long, and each one wire of shielded-line, parallel wire and twisted-paired wire of one meter long. The inductance is measured in micro-H, and the inductance of lead-wires are measured greater values than those of others. The inductance value changes greatly depending on the space between the lead-wires. When the space between the lead-wires is 200 mm, the inductance is 1.8 micro-H, while the inductance is 0.5 micro-H in solid-contact condition, i.e., the same condition as the parallel wire is used. Thus the difference in inductance between these two conditions is as much as 3.6 times. Therefore, it is difficult to specify an inductance value in the lead-wires, which may cause a design unreliable. On the other hand, a shielded-line has very small inductance, and a space between core-wire 30 and outer wire 31 stays constant, thus the inductance also stays constant. Therefore, an inductance value in the shielded-line can be fixed for a reliable design. Since the inductance value of the power lead is specified, the necessary value of electrostatic capacitance of capacitor 28 can be exactly specified when film capacitor 28 used in the second embodiment is added to the circuit. It is thus not needed to put a film capacitor of an unreasonably large capacitance, so that the circuit can be downsized and light-weighted. Further, since the shielded-line is only one piece of line and contributes to more efficient work than two lead-wires. It is not limited to use the shielded-line shown in FIG. 10A, and a metallic pipe can be used instead of outer wire 31.

Fourth Exemplary Embodiment

Figure 12:
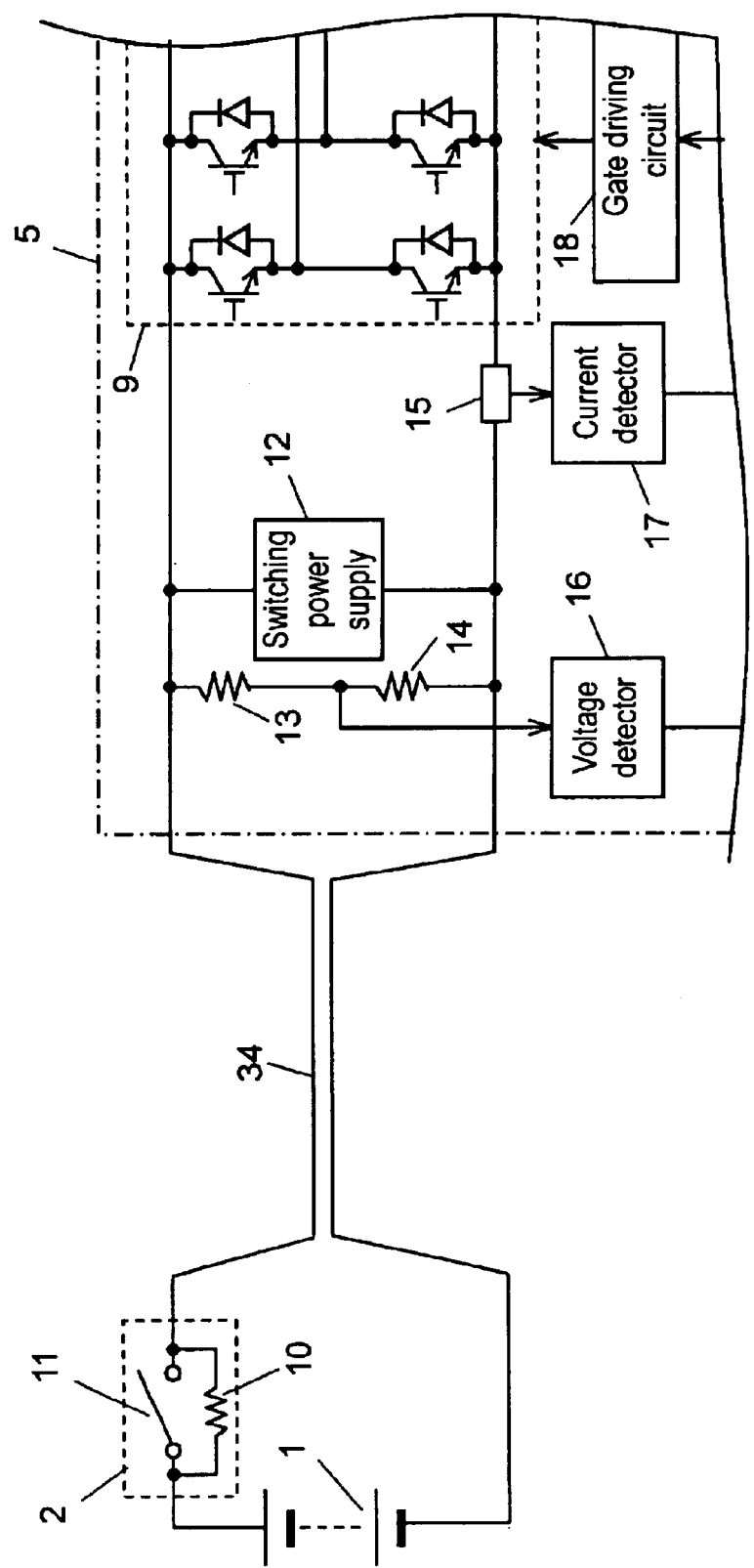
FIG. 12 is a circuit diagram of a compressor-driving device in accordance with a fourth exemplary embodiment of the present invention.

FIG. 12 shows a circuit diagram of a compressor-driving device in accordance with the fourth embodiment. This circuit diagram differs from that shown in FIG. 4 (the first embodiment) in one-piece line formed of parallel power-lead wires 34.

Figure 13:
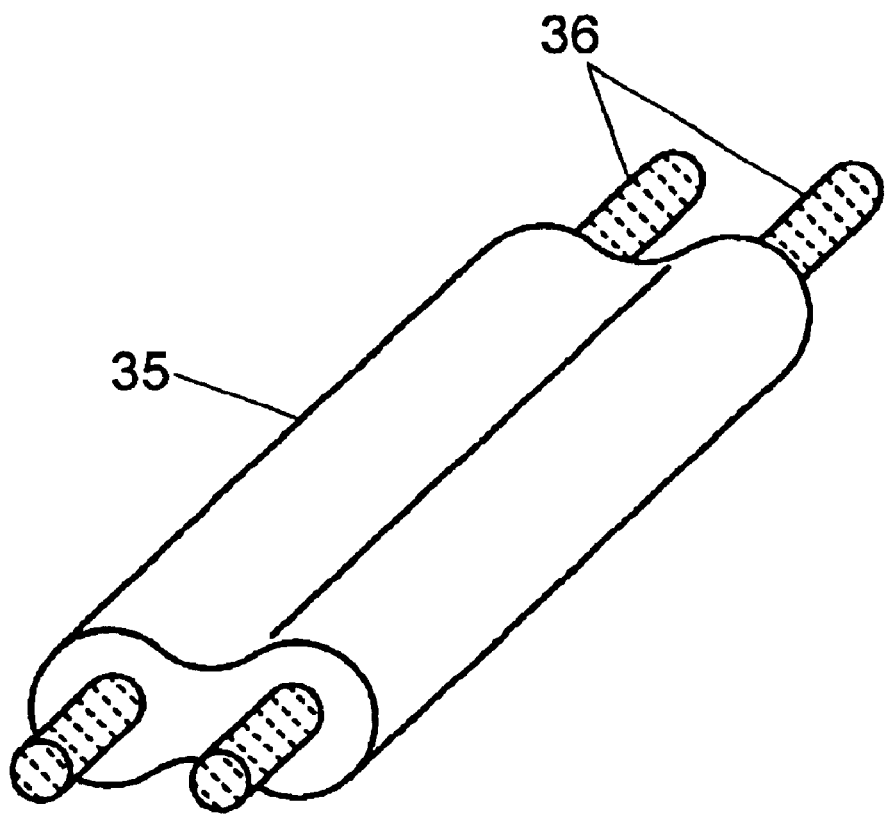
FIG. 13 illustrates a structure of parallel wires in accordance with the fourth exemplary embodiment of the present invention.

FIG. 13 illustrates a structure of the parallel wires. Two lead-wires 36 are held in parallel with bendable resin 35. This structure can be achievable also by taping up the two wires or extending the two wires through a vinyl tube. This structure produces small inductance as shown in FIG. 11, and since the space between the two wires 36 stays constant, the inductance also stays constant. Therefore, an inductance value can be specified for a reliable design. Since the inductance value of the power lead is specified, the necessary value of electrostatic capacitance of capacitor 28 can be exactly specified when film capacitor 28 used in the second embodiment is added to the circuit. It is thus not needed to put a film capacitor of an unreasonably large capacitance, so that the circuit can be downsized and light-weighted. Further, since the parallel line is only one-piece line and contributes to more efficient work than two lead-wires. Wire termination is easier on this wire used in the fourth embodiment than the shielded-line used in the third embodiment.

Fifth Exemplary Embodiment

Figure 14:
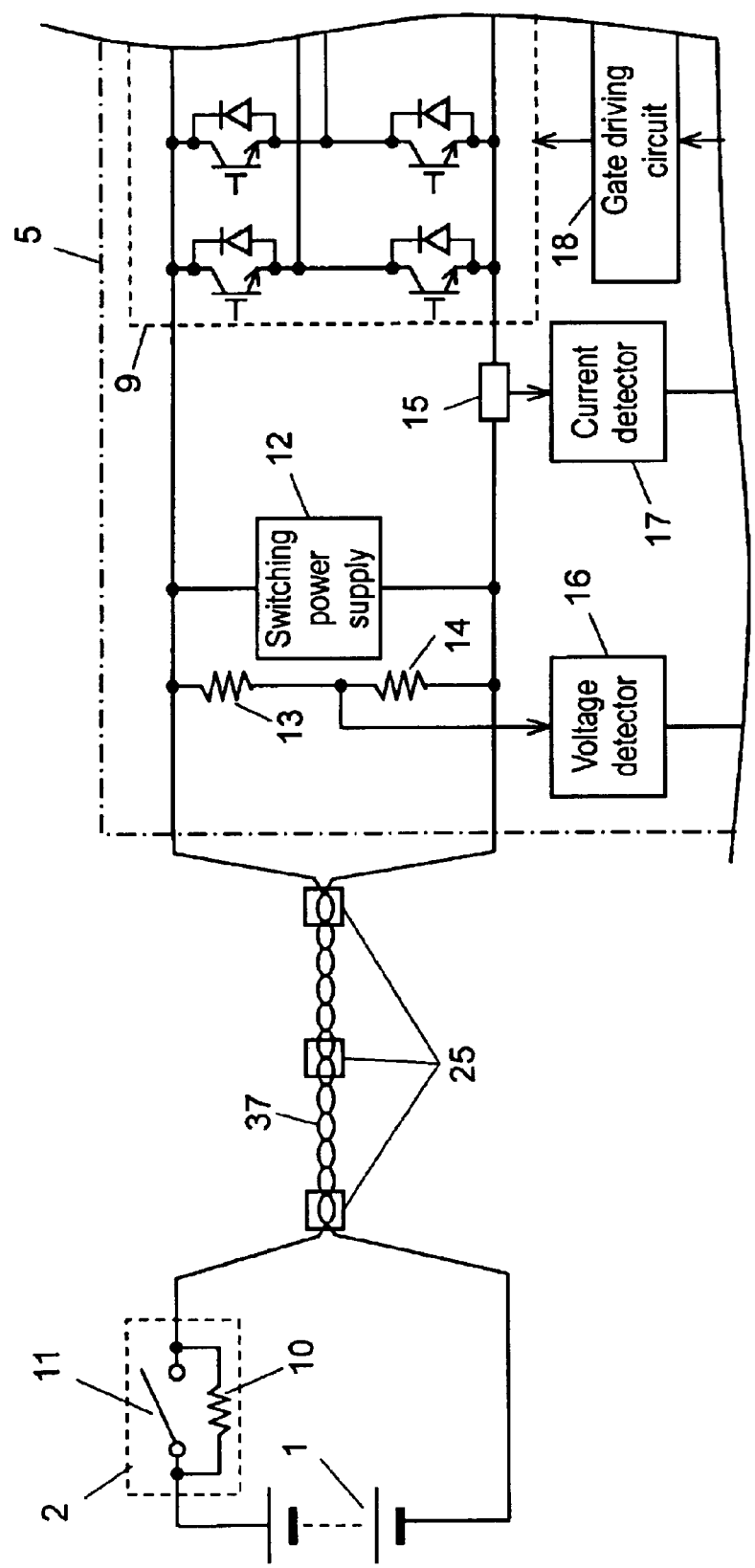
FIG. 14 is a circuit diagram of a compressor-driving device in accordance with a fifth exemplary embodiment of the present invention.

FIG. 14 shows a circuit diagram of a compressor-driving device in accordance with the fifth embodiment. This circuit diagram differs from that shown in FIG. 4 (the first embodiment) in twisted-paired wires 37 used as a power-lead. Two twisted-paired wires are tightly held with tape 25. The inductance of this twisted-paired wires is small as shown in FIG. 11. Since the wires are twisted, the space between the two wires stays constant, and the inductance also stays constant. An inductance value can be thus specified for a reliable design. Since the inductance value of the power lead is specified, the necessary value of electrostatic capacitance of capacitor 28 can be exactly specified when film capacitor 28 used in the second embodiment is added to the circuit. It is thus not needed to put a film capacitor of an unreasonably large capacitance, so that the circuit can be downsized and light-weighted. The twisted-paired wires can be produced by just twisting the wires, which is easier than the shielded-line used in the third embodiment or the parallel wires used in the fourth embodiment. Thus the twisted-paired wires can facilitate downsizing and light-weighting of the circuit better than other two types of wires.

Sixth Exemplary Embodiment

Figure 15:
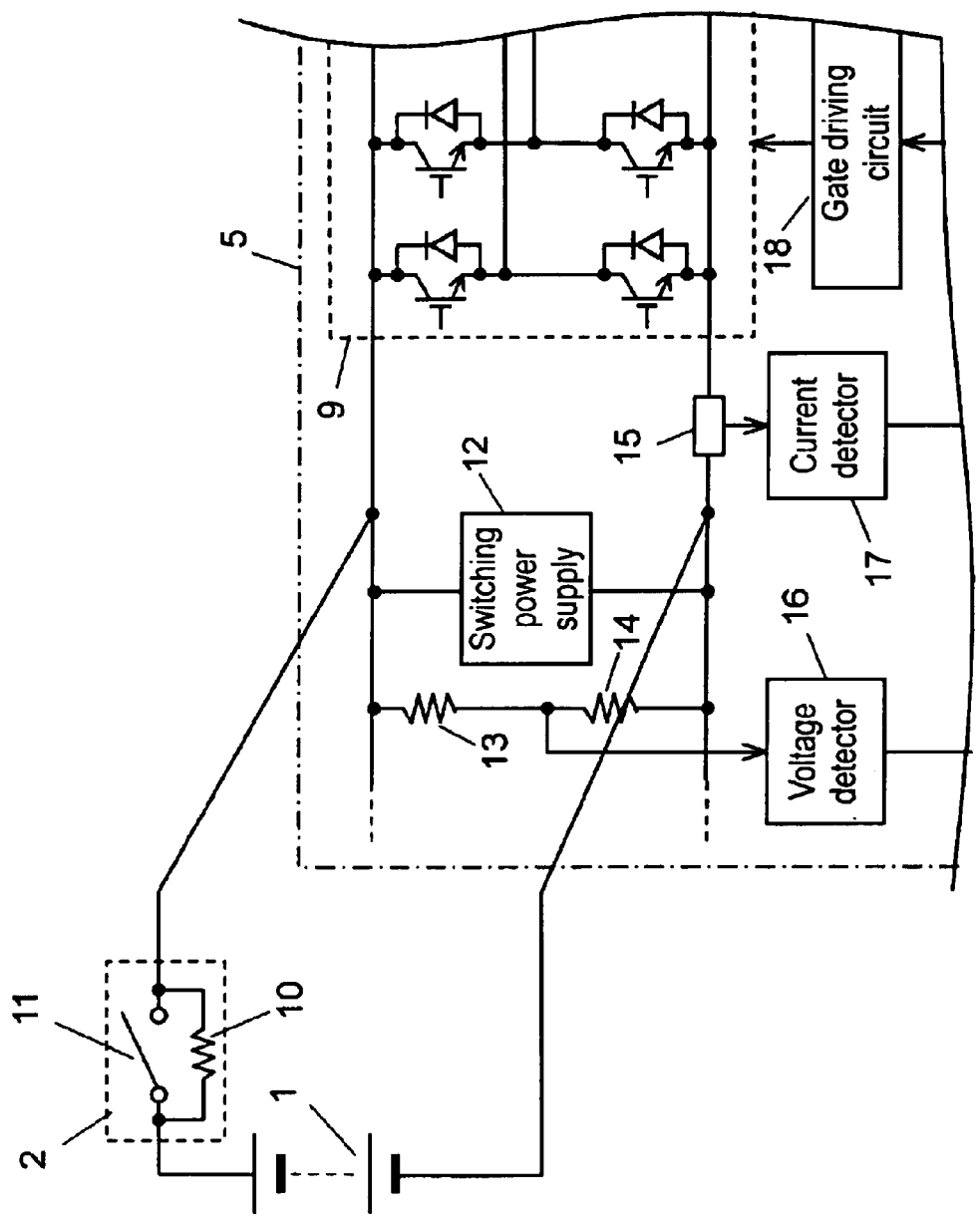
FIG. 15 is a circuit diagram of a compressor-driving device in accordance with a sixth exemplary embodiment of the present invention.

FIG. 15 shows a circuit diagram of a compressor-driving device in accordance with the sixth embodiment. This circuit diagram differs from that shown in FIG. 4 (the first embodiment) in a location of an outlet of power-lead wires. The power-lead wires of the sixth embodiment do not run through switching power-supply 12, upper divided-resistor 13, or lower divided-resistor 14. This wiring reduces the inductance on circuit board 57 of the compressor-driving device. The plus (+) side and the minus (−) side are assigned to the front and the back faces, or vice versa, of the printed circuit board on which copper foil is applied, and wires can be laid out in parallel. This structure can also reduce the inductance.

Seventh Exemplary Embodiment

Figure 16:
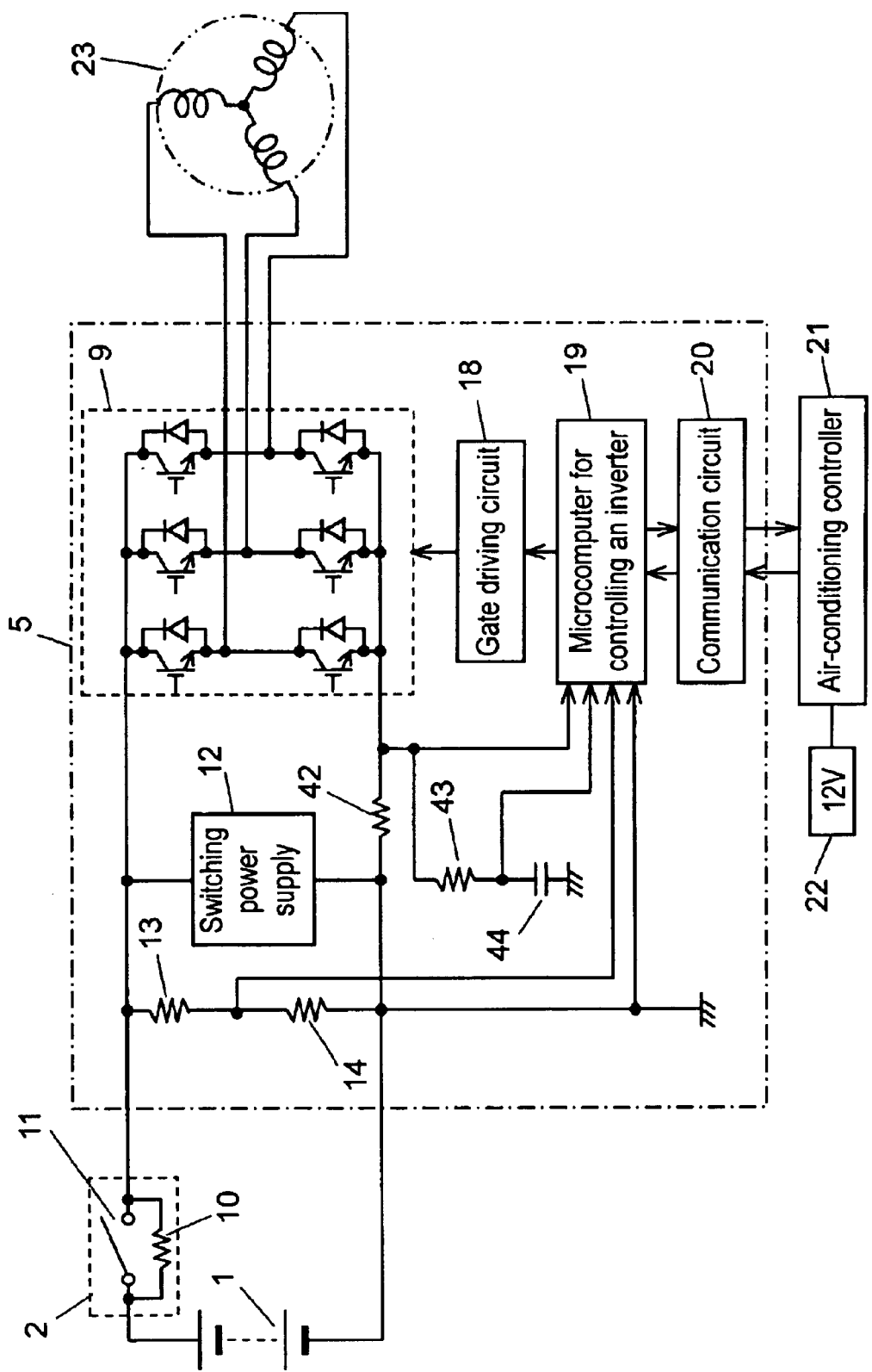
FIG. 16 is a circuit diagram of a compressor-driving device in accordance with a seventh exemplary embodiment of the present invention.

FIG. 16 shows a circuit diagram of a compressor-driving device in accordance with the seventh embodiment. This circuit diagram differs from that shown in FIG. 4 (the first embodiment) in deleting current sensor 15, voltage detector 16, current detector 17, and in adding current-detecting resistor 42, integrating resistor 43, integrating capacitor 44. In addition to these differences, power supply 22 of 12V is not connected to the circuit. Microcomputer 19 for controlling an inverter is powered by switching power supply 12 instead of power supply 22 of 12V, and shares a grounding with battery 1. The divided voltages of upper and lower voltage-dividing resistors 13 and 14 can be directly supplied to microcomputer 19. A voltage across current-detecting resistor 42 (shunt resistor) can be directly input to microcomputer 19 as a detected current value. This detected current value is used as a protection-halting signal, thus it can be processed in the circuit instead of being supplied to microcomputer 19. When an average of the detected current values is needed, the value integrated by resistor 43 and capacitor 44 can be directly input to microcomputer 19. The inductance of current-detecting resistor 42 (shunt resistor) is close to zero (0) as shown in FIG. 11. Communicating circuit 20 communicates with air-conditioning controller 21 in an insulated condition by using a photo-coupler. This structure allows the power-lead wires of power supply 22 of 12V to be free from intensive noises due to electromagnetic wave, even if compressor-driving device 5 is placed close to drive-motor driving device 4, because device 5 does not use power supply 22. As a result, electronic apparatuses such as device 5, an audio apparatus and the like can work free from interference. Since current-detecting resistor 42 has an inductance value close to 0 (zero), resistor 42 is free from noises due to electromagnetic wave. Thus the withstanding characteristic against the electromagnetic wave noise can be improved in compressor-driving device 5.

Eighth Exemplary Embodiment

Figure 17:
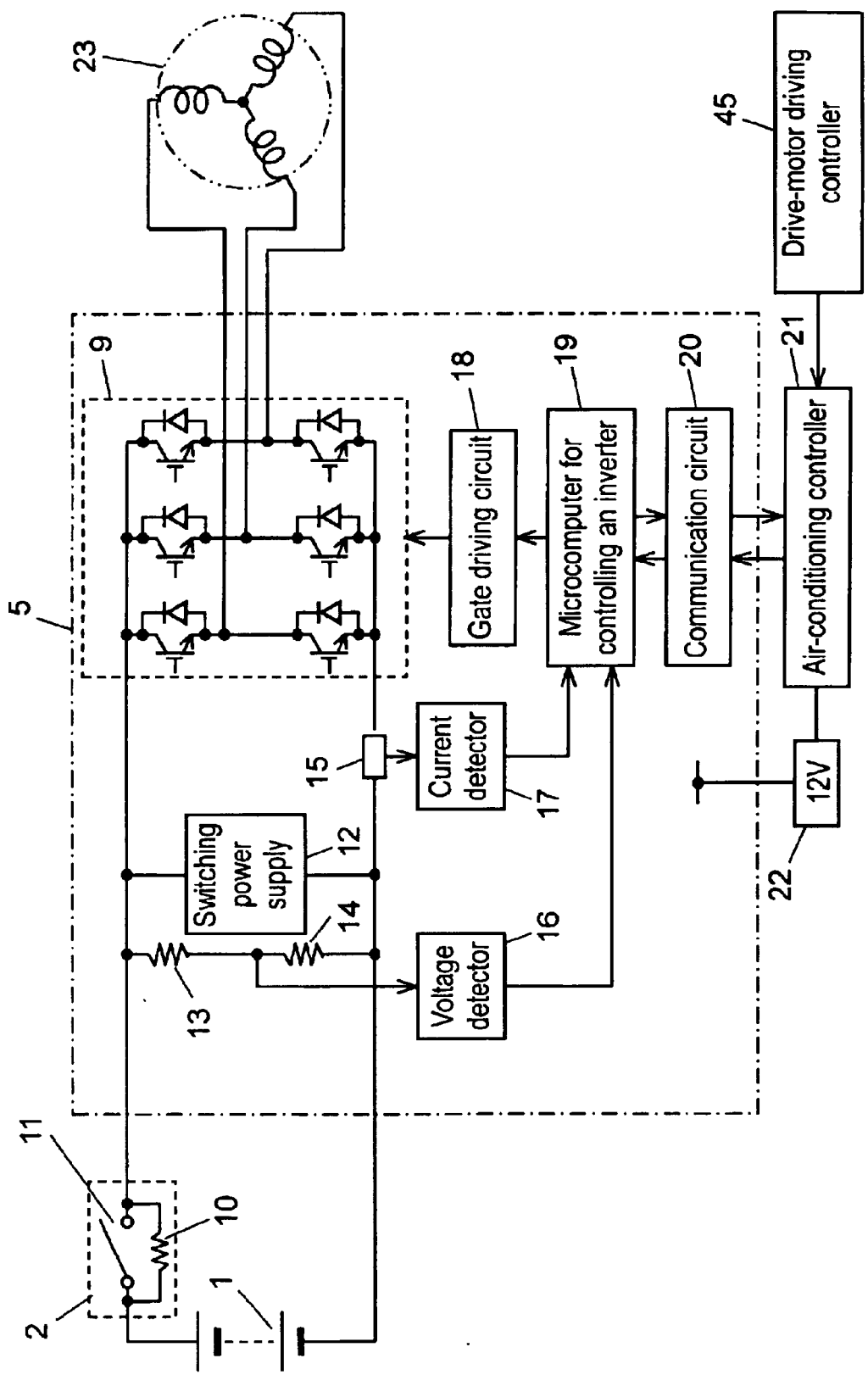
FIG. 17 is a circuit diagram of a compressor-driving device in accordance with a eight exemplary embodiment of the present invention.

FIG. 17 shows a circuit diagram of a compressor-driving device in accordance with the eighth embodiment. This circuit diagram differs from that shown in FIG. 4 (the first embodiment) in a signal being sent to air-conditioning controller 21 from drive-motor driving controller 45.

Figure 18:
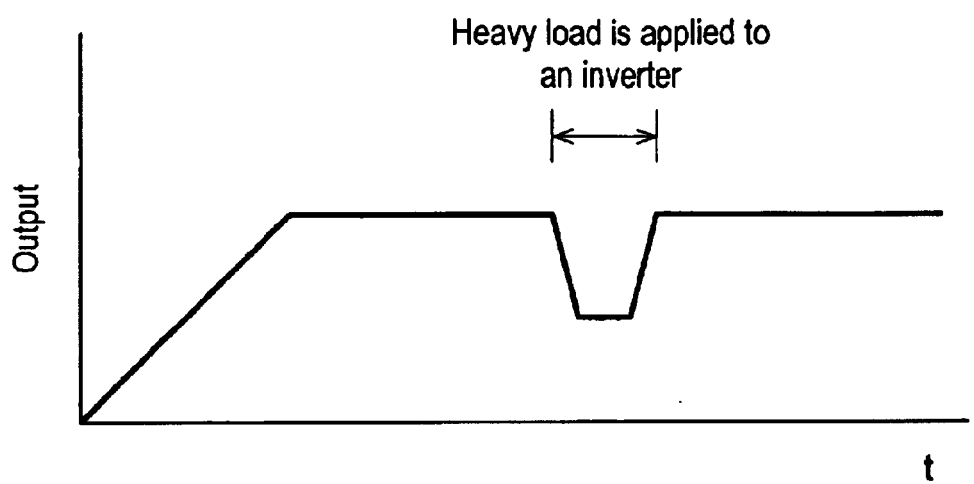
FIG. 18 shows an operation of an air-conditioner in accordance with the eighth exemplary embodiment of the present invention.

FIG. 18 shows an operation of an air conditioner in accordance with the eighth embodiment. When drive-motor driving device 4 is heavily loaded, a heavy-load signal is sent from controller 45 to air-conditioning controller 21, thereby lowering an output of compressor-driving device 5. The control discussed above is effective to, e.g., a compact electric vehicle or a hybrid electric vehicle of which drive-motor driving device 4 outputs relatively small. This structure allows electrolytic capacitor 3 to be shared in a highly reliable manner.

The transmission of the heavy-load signal to device 5 is not limited to the way discussed above. The signal can be sent from a battery controller without traveling through air conditioning controller 21. A heavily loaded status of device 4 includes the statuses such as at max. output, at accelerating and so on. In device 5, a voltage drop can be detected with voltage detector 16 to find that device 4 is heavily loaded.

Ninth Exemplary Embodiment

FIG. 19A illustrates a first harness in accordance with the ninth embodiment. Core wire 30 of shielded-line 29 differs from outer wire 31 in length. FIG. 19B shows a second harness, which differs from the first one in terminal, i.e., the first one uses round-terminal 24 while the second one uses connector 38. FIG. 19C shows a third harness, where the first one is connected. FIG. 19D shows a fourth harness, where the second one is connected. Outer wire 31, which is shorter than core wire 30, can be connected to only the closest terminal. Although a conventional manner requires numbers of connections before the power supply, this embodiment needs only one connection, and also a reversal connection can be prevented with this method. Employing terminals different in sizes and types would determine the combination of male vs. female mechanically, so that the reversal connection can be prevented more positively. The structure discussed above can eliminate protective diode 63 against the reversal connection, so that downsizing and energy-saving can be expected. Film capacitor 28 used in the second embodiment can be used in this ninth embodiment. The difference in wire length can be adjusted with a copper foil length of the printed circuit board so that the total lengths can be equal. Terminals 24 are not always coupled to capacitor 3. Parallel wires can be used with the same advantage.

Tenth Exemplary Embodiment

Figure 20:
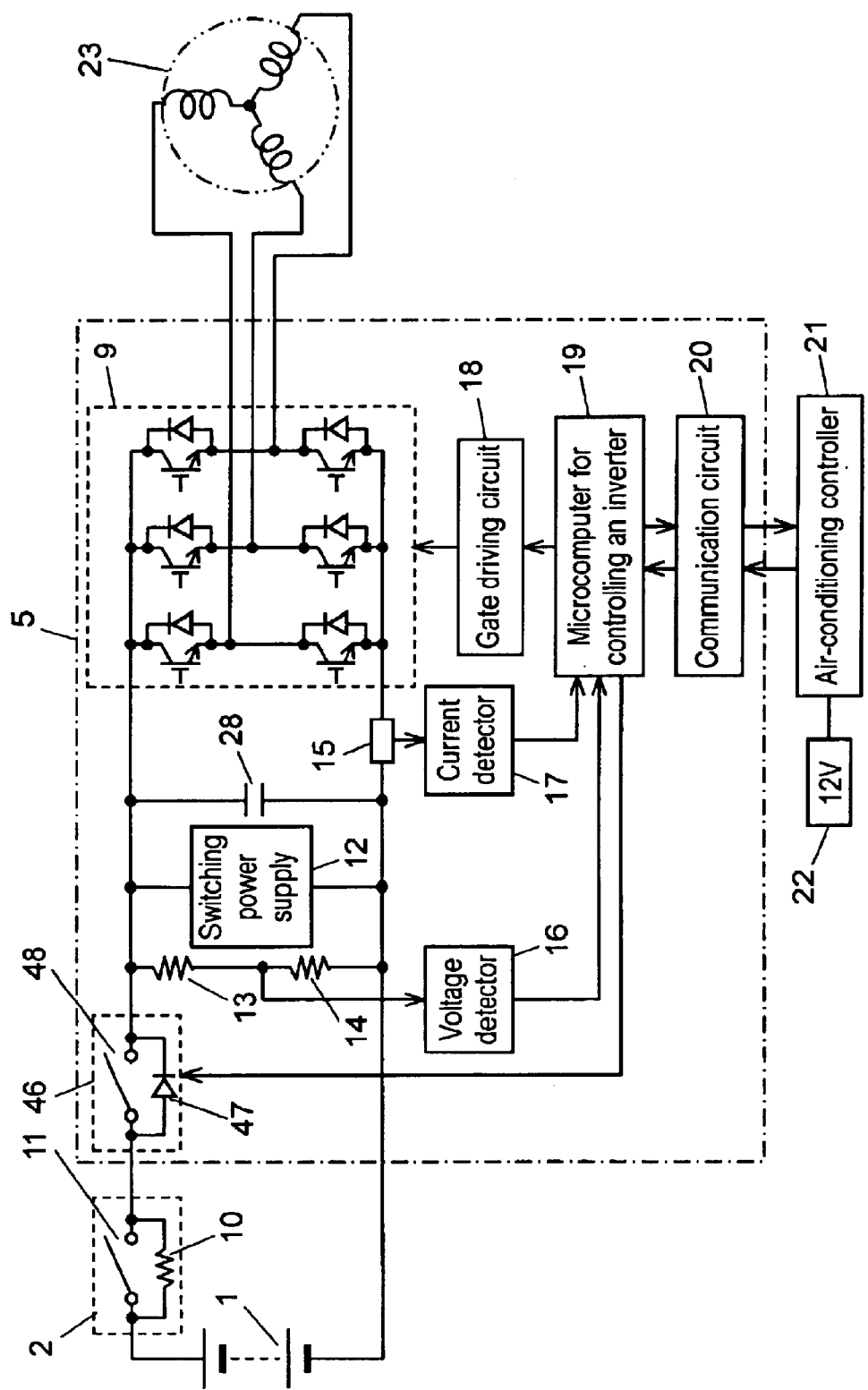
FIG. 20 is a circuit diagram of a compressor-driving device in accordance with a tenth exemplary embodiment of the present invention.

FIG. 20 shows a circuit diagram of a compressor-driving device in accordance with the tenth embodiment. This circuit differs from that shown in FIG. 4 (the first embodiment) in the following two points: (a) protective circuit 46 against a reversal connection is inserted in a power-line; and (b) power supply 22 of 12V is not connected to this circuit. Starting diode 47 for switching power supply 12 is turned on only when the plus (+) and minus (−) of the power supply are normally connected. The power supply system of compressor-driving device 5 is the same as that used in the seventh embodiment. Therefore, microcomputer 19 powered by switching power supply 12 closes a switch, e.g., sub-relay 48, thereby activating inverter-circuit 9. When the plus (+) and minus (−) are reversely connected, starting diode 47 for switching power supply 12 does not allow the current to flow due to the reversal direction. Since the current running through inverter-circuit 9 does not flow through starting diode 47, no consideration is needed about heat generation. Sub-relay 48, through which the inverter current runs, is vulnerable to electrical noises; however, since power supply 22 of 12V is not connected thereto, the electrical equipment on the electric vehicle is prevented from being interfered by the electrical noise.

Figure 21:
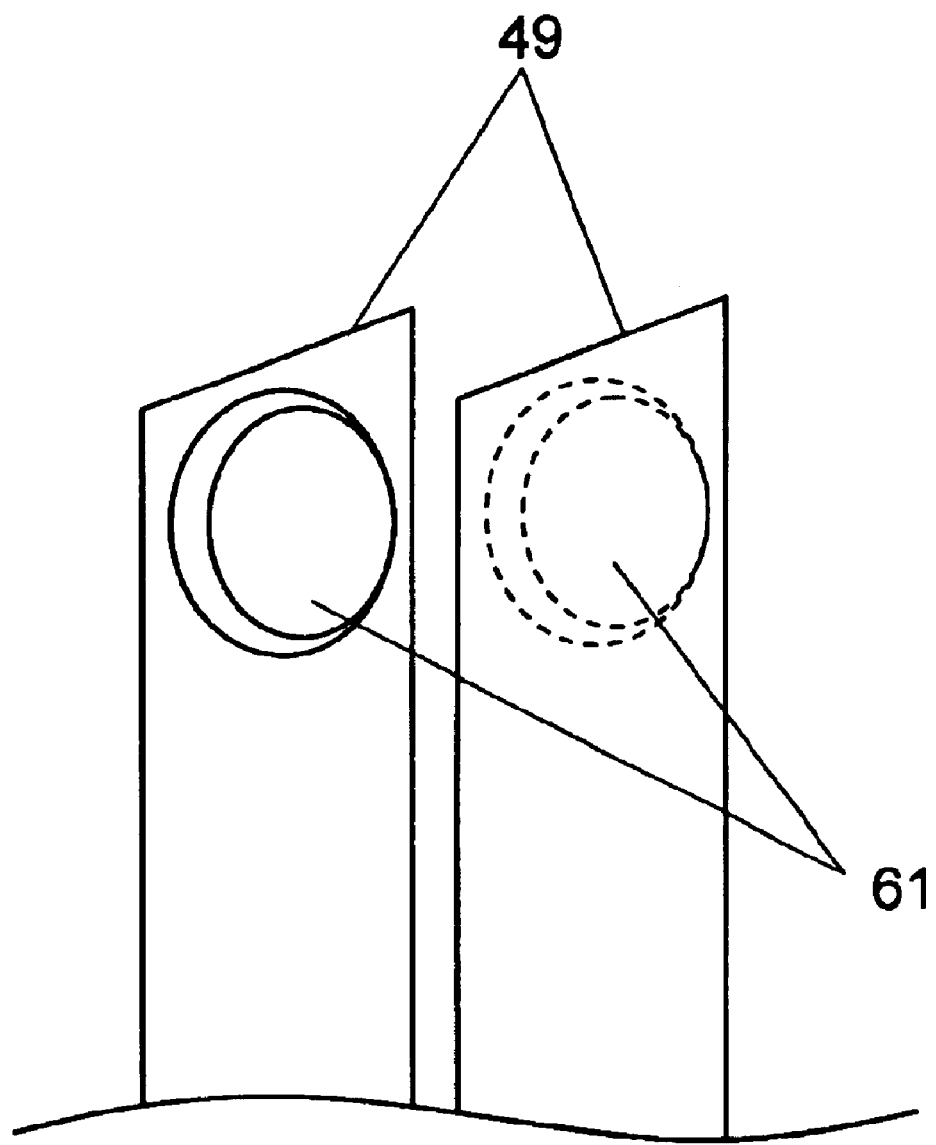
FIG. 21 shows a structure of a relay contact in accordance with the tenth exemplary embodiment of the present invention.

FIG. 21 shows a structure of relay contacts in accordance with the tenth embodiment. Relay contact plates 49 face each other in parallel and sub-relay contact 61 is disposed at an upper section of respective plates. This structure allows the currents running in the opposite directions with each other to cancel the magnetic fields. The inductance of sub-relay 48 is thus limited to a low level.

Figure 22:
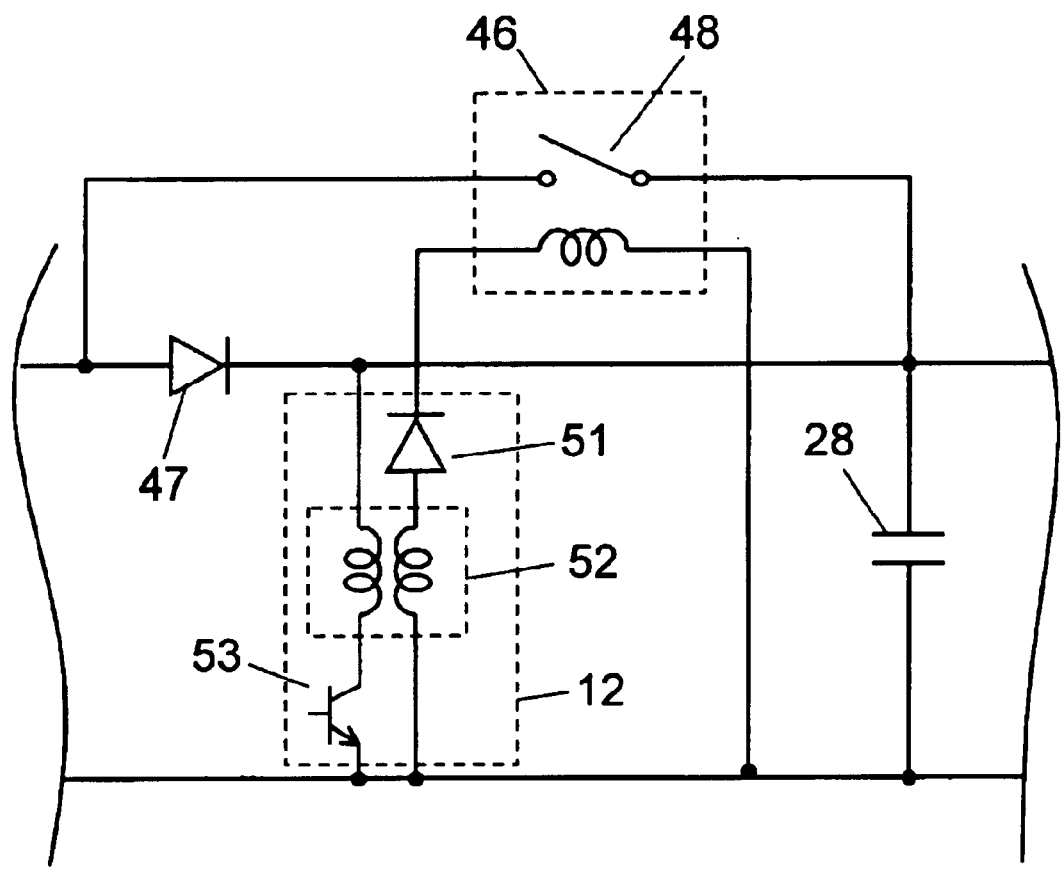
FIG. 22 is a circuit diagram of the relay contact in accordance with the tenth exemplary embodiment of the present invention.
Figure 23A:
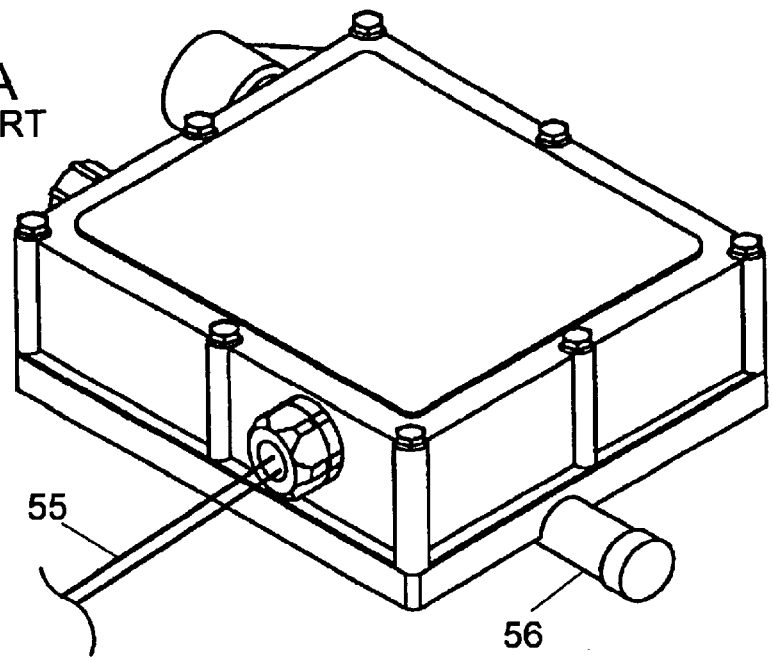
FIG. 23A shows an outlook of a conventional compressor-driving device.
Figure 23B:
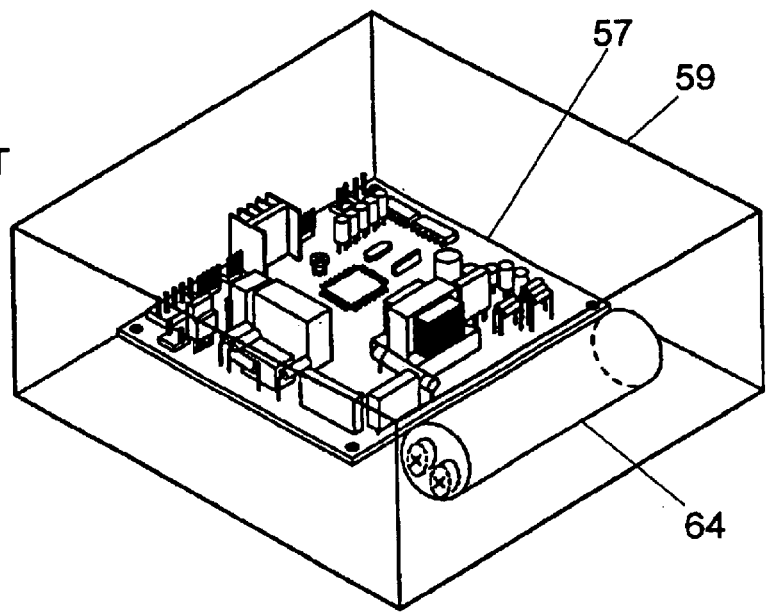
FIG. 23B illustrates the inside of the conventional compressor-driving device shown in FIG. 23A.
Figure 24:
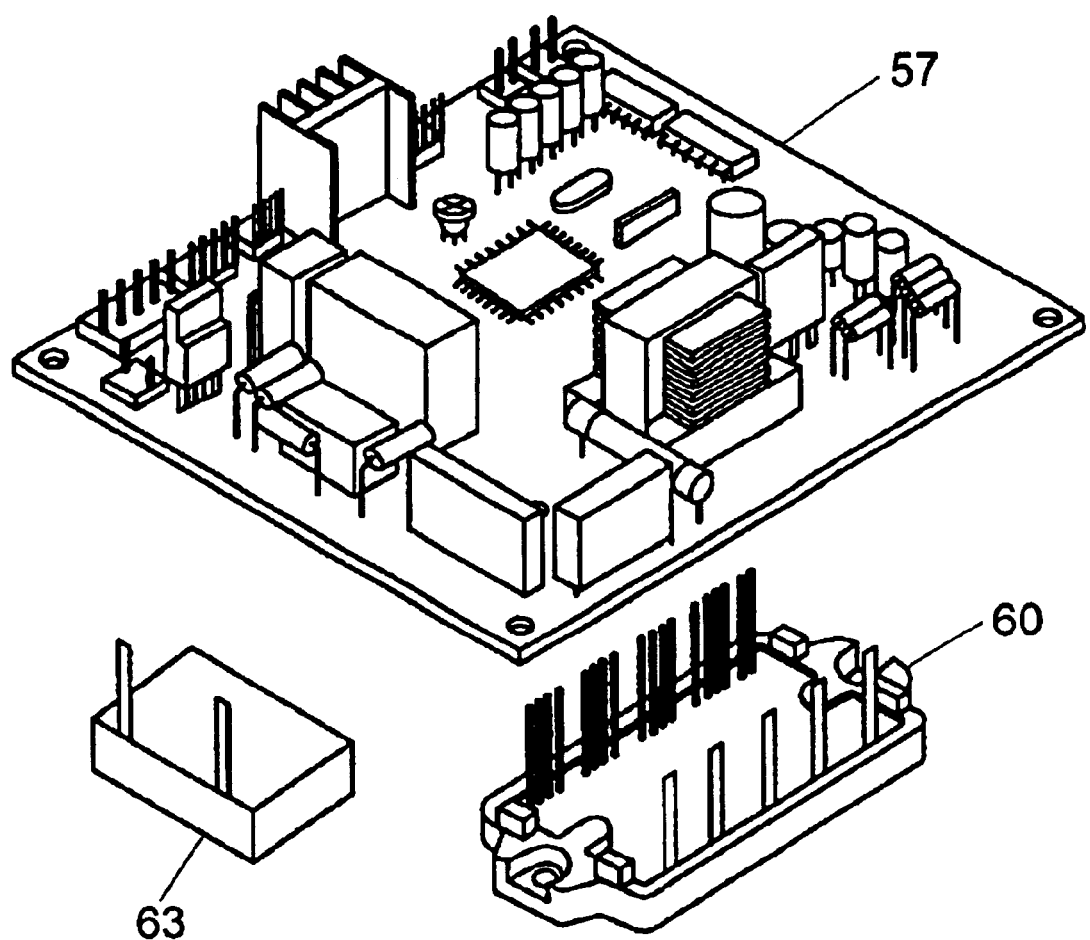
FIG. 24 shows a circuit board of the conventional compressor-driving device.

FIG. 22 shows a circuit diagram for driving a relay in accordance with the tenth embodiment. This circuit turns on sub-relay 48 without using microcomputer 19. When the plus (+) and minus (−) of the power supply are connected normally, starting diode 47 powers switching power supply 12, and activates power transistor 53. Then transformer 52 of the switching power supply 12 powers a coil of sub-relay 48 via rectifying diode 51, and sub-relay 48 is turned on Switching power supply 12 has other outputs though they are not shown. Switching power supply 12 can be built with only coils without using transformer 52. Sub-relay 48, through which the inverter current flows, is vulnerable to electrical noises; however, since microcomputer 19 is not connected to sub-relay 48, microcomputer 19 is not subject to the noises. Thus malfunction of microcomputer 19 due to the electrical noises can be prevented. This structure eliminates protective diode 63 against reversal connection, and thus achieves downsizing as well as energy saving.

What is claimed is:

1. An electric circuit of an electric vehicle, said circuit comprising:
   (a) a drive-motor;
   (b) a drive-motor driving device;
   (c) an electric compressor for air-conditioning the vehicle;
   (d) compressor-driving device;
   (e) a dc power supply, coupled to input terminals of said drive-motor driving device, for powering both of said drive-motor driving device and said compressor-driving device;
   (f) a smoothing capacitor coupled to the input terminals of said drive-motor driving device, and shared by both of said drive-motor driving device and said compressor-driving device;
   (g) a radiator shared by both of said drive-motor driving device and said compressor-driving device; and
   (h) a case for shielding electromagnetic wave,
   wherein said drive-motor driving device, said compressor-driving device, said radiator, and said smoothing capacitor are disposed in said case,
   the input terminals and said smoothing capacitor are connected to each other in the case, the connection extending one set of wires outside the case for coupling to said dc power supply,
   wherein said smoothing capacitor, which is disposed outside said dc power supply, is coupled to respective input terminals of said drive-motor driving device and said compressor-driving device,
   a location of said compressor-driving device relative to a location of said smoothing capacitor limits a surge voltage generated by current which flows in wires extending from said smoothing capacitor to said compressor-driving device, and
   said compressor-driving device lowers an output of said compressor-driving device when load of said drive-motor driving device is above a heavily loaded level.

2. The electric circuit of claim 1, wherein
said dc power supply extends wires to said compressor-driving device for powering, the wires having different lengths in plus (+) and minus (−) for preventing the wires from being reversely connected to said dc power supply.

3. The electric circuit of claim 1, wherein
said compressor-driving device includes one of a film capacitor and a ceramic capacitor for absorbing a surge voltage, one of the capacitors being coupled between wires extended from said dc power supply.

4. The electric circuit of claim 1, wherein
the wires extended to said compressor-driving device are for powering and include a shielded-line having a core wire and an outer wire, the core wire and the outer wire supplying power.

5. The electric circuit of claim 1, wherein
the wires extended to said compressor-driving device are for powering and include parallel wires held by bendable resin.

6. The electric circuit of claim 1, wherein
the wires extended to said compressor-driving device are for powering and include twisted-paired wires.

7. The electric circuit of claim 1, wherein
said compressor-driving device includes an inverter-circuit, and a power-line extended from said dc power supply to said compressor-driving device for powering is coupled to an input terminal of the inverter-circuit directly or via a current detector which detects current in the inverter-circuit.

8. The electric circuit of claim 1, wherein
said compressor-driving device includes (d-1) driving-device controlling circuit for controlling the driving device; and (d-2) a power supply circuit for obtaining an exclusive control power supply by converting a voltage supplied from said dc power supply, the driving-device controlling circuit using the exclusive control power supply.

9. The electric circuit of claim 4, wherein
the wires of power lines have different lengths in plus (+) and minus (−) for preventing the wires from being reversely coupled to said dc power supply.

10. The electric circuit of claim 5, wherein
the wires of power lines have different lengths in plus (+) and minus (−) for preventing the wires from being reversely coupled to said dc power supply.

11. The electric circuit of claim 8, wherein
said compressor-driving device includes a diode through which current flows when a power-line extended from said dc power supply to said compressor-driving device is normally connected, and a switch disposed in parallel with the diode.

12. An electric circuit according to claim 1, wherein said heavily loaded level is a predetermined level.

13. An electric circuit of an electric vehicle, said circuit comprising:
(a) a drive-motor;
(b) a drive-motor driving device;
(c) an electric compressor for air-conditioning the vehicle;
(d) a compressor-driving device including one of a film capacitor and a ceramic capacitor for absorbing a surge voltage, one of the capacitors being coupled between the wires extended from a dc power supply;
(e) said dc power supply being coupled to input terminals of said drive-motor driving device for powering both of said drive-motor driving device and said compressor-driving device;
(f) a smoothing capacitor coupled to an input terminal of said drive-motor driving device, and shared by both of said drive-motor driving device and said compressor-driving device;
(g) a radiator shared by both of said drive-motor driving device and said compressor-driving device; and
(h) a case for shielding electromagnetic wave,
wherein said drive-motor driving device, said compressor-driving device, and said smoothing capacitor are disposed in said case,
the input terminals and said smoothing capacitor are connected to each other in the case, the connection extending one set of wires outside the case for coupling to said dc power supply,
wherein said smoothing capacitor, which is disposed outside said dc power supply, is coupled to respective input terminals of said drive-motor driving device and said compressor-driving device, and
a location of said compressor-driving device relative to a location of said smoothing capacitor limits a surge voltage generated by current which flows in wires extending from said smoothing capacitor to said compressor-driving device,
wherein the wires extended to said compressor-driving device are for powering and include a shielded-line having a core wire and an outer wire, the core wire and the outer wire supplying power, and
said compressor-driving device lowers an output of said compressor-driving device when load of said drive-motor driving device is above a heavily loaded level.

14. An electric circuit according to claim 13, wherein said heavily loaded level is a predetermined level.

15. An electric circuit of an electric vehicle, said circuit comprising:
(a) a drive-motor;
(b) a drive-motor driving device;
(c) an electric compressor for air-conditioning the vehicle;
(d) a compressor-driving device including one of a film capacitor and a ceramic capacitor for absorbing a surge voltage, one of the capacitors being coupled between the wires extended from a dc power supply;
(e) said dc power supply being coupled to input terminals of said drive-motor driving device for powering both of said drive-motor driving device and said compressor-driving device;
(f) a smoothing capacitor coupled to an input terminal of said drive-motor driving device, and shared by both of said drive-motor driving device and said compressor-driving device;
(g) a radiator shared by both of said drive-motor driving device and said compressor-driving device; and
(h) a case for shielding electromagnetic wave,
wherein said drive-motor driving device, said compressor-driving device, and said smoothing capacitor are disposed in said case,
the input terminals and said smoothing capacitor are connected to each other in the case, the connection extending one set of wires outside the case for coupling to said dc power supply,
wherein said smoothing capacitor, which is disposed outside said dc power supply, is coupled to respective input terminals of said drive-motor driving device and said compressor-driving device,
a location of said compressor-driving device relative to a location of said smoothing capacitor limits a surge voltage generated by current which flows in wires extending from said smoothing capacitor to said compressor-driving device,
wherein the wires extended to said compressor-driving device are for powering and include parallel wires held by bendable resin, and
said compressor-driving device lowers an output of said compressor-driving device when load of said drive-motor driving device is above a heavily loaded level.

16. An electric circuit according to claim 15, wherein said heavily loaded level is a predetermined level.

17. An electric circuit of an electric vehicle, said circuit comprising:
(a) a drive-motor;
(b) a drive-motor driving device;
(c) an electric compressor for air-conditioning the vehicle;
(d) a compressor-driving device including one of a film capacitor and a ceramic capacitor for absorbing a surge voltage, one of the capacitors being coupled between the wires extended from a dc power supply;
(e) said dc power supply being coupled to input terminals of said drive-motor driving device for powering both of said drive-motor driving device and said compressor-driving device;
(f) a smoothing capacitor coupled to an input terminal of said drive-motor driving device, and shared by both of said drive-motor driving device and said compressor-driving device;
(g) a radiator shared by both of said drive-motor driving device and said compressor-driving device; and
(h) a case for shielding electromagnetic wave,
wherein said drive-motor driving device, said compressor-driving device, and said smoothing capacitor are disposed in said case,
the input terminals and said smoothing capacitor are connected to each other in the case, the connection extending one set of wires outside the case for coupling to said dc power supply,
wherein said smoothing capacitor, which is disposed outside said dc power supply, is coupled to respective input terminals of said drive-motor driving device and said compressor-driving device, and
a location of said compressor-driving device relative to a location of said smoothing capacitor limits a surge voltage generated by current which flows in wires extending from said smoothing capacitor to said compressor-driving device,
wherein the wires extended to said compressor-driving device are for powering and include parallel wires held by bendable resin, and said compressor-driving device lowers an output of said compressor-driving device when load of said drive-motor driving device is above a heavily loaded level.

18. An electric circuit according to claim 17, wherein said heavily loaded level is a predetermined level.

19. An electric circuit of an electric vehicle, said circuit comprising:
(a) a drive-motor;
(b) a drive-motor driving device;
(c) an electric compressor for air-conditioning the vehicle;
(d) a compressor-driving device including (d-1) driving-device controlling circuit for controlling the driving device; and (d-2) a power supply circuit for obtaining an exclusive control power supply by converting a voltage supplied from a dc power supply, the driving-device controlling circuit using the exclusive control power supply;
(e) said dc power supply being coupled to input terminals of said drive-motor driving device for powering both of said drive-motor driving device and said compressor-driving device;
(f) a smoothing capacitor coupled to an input terminal of said drive-motor driving device, and shared by both of said drive-motor driving device and said compressor-driving device;
(g) a radiator shared by both of said drive-motor driving device and said compressor-driving device; and
(h) a case for shielding electromagnetic wave,
the input terminals and said smoothing capacitor are connected to each other in the case, the connection extending one set of wires outside the case for coupling to said dc power supply,
wherein said smoothing capacitor, which is disposed outside said dc power supply, is coupled to respective input terminals of said drive-motor driving device and said compressor-driving device, and
a location of said compressor-driving device relative to a location of said smoothing capacitor limits a surge voltage generated by current which flows in wires extending from said smoothing capacitor to said compressor-driving device,
wherein said drive-motor driving device, said compressor-driving device, and said smoothing capacitor are disposed in said case, and
said compressor-driving device lowers an output of said compressor-driving device when load of said drive-motor driving device is above a heavily loaded level.

20. An electric circuit according to claim 19, wherein said heavily loaded level is a predetermined level.

* * * * *